US010921608B2

United States Patent
Bietry et al.

(10) Patent No.: US 10,921,608 B2
(45) Date of Patent: Feb. 16, 2021

(54) DESPECKLING SYSTEM FOR PROJECTED LIGHT

(71) Applicant: IMAX Theatres International Limited, Dublin (IE)

(72) Inventors: Joseph R. Bietry, Rochester, NY (US); Andrew F. Kurtz, Macedon, NY (US)

(73) Assignee: IMAX Theatres International Limited, Dublin (IE)

(*) Notice: Subject to any disclaimer, the term of this patent is extended or adjusted under 35 U.S.C. 154(b) by 0 days.

(21) Appl. No.: 15/543,733

(22) PCT Filed: Feb. 18, 2016

(86) PCT No.: PCT/IB2016/050886
§ 371 (c)(1),
(2) Date: Jul. 14, 2017

(87) PCT Pub. No.: WO2016/132321
PCT Pub. Date: Aug. 25, 2016

(65) Prior Publication Data
US 2017/0371173 A1  Dec. 28, 2017

Related U.S. Application Data

(60) Provisional application No. 62/117,756, filed on Feb. 18, 2015.

(51) Int. Cl.
*G02B 27/48* (2006.01)
*H04N 9/31* (2006.01)
*G02B 26/08* (2006.01)

(52) U.S. Cl.
CPC ......... *G02B 27/48* (2013.01); *G02B 26/0875* (2013.01); *G02B 26/0891* (2013.01); *H04N 9/3161* (2013.01)

(58) Field of Classification Search
CPC ............ G02B 26/0875; G02B 26/0891; G02B 27/48; H04N 9/3161
See application file for complete search history.

(56) References Cited

U.S. PATENT DOCUMENTS 5,483,342 A * 1/1996 Rockwell ............. G02B 5/3083
356/491
5,583,694 A * 12/1996 Takahashi ................ G02B 1/06
359/557

(Continued)

FOREIGN PATENT DOCUMENTS

CN    1790094    6/2006
CN    101183178   5/2008
(Continued)

OTHER PUBLICATIONS

Examiner provided machine translation of Ando et al. JP 2013254031 A (Year: 2013).*

(Continued)

*Primary Examiner* — Bumsuk Won
*Assistant Examiner* — Balram T Parbadia
(74) *Attorney, Agent, or Firm* — Kilpatrick Townsend & Stockton LLP

(57) ABSTRACT

Speckle artifacts as viewed in images projected on a display surface by a projector can be reduced. At least one spatial light modulator, illuminated by one or more light sources, can be imaged to a screen by a projection lens. A deflector subsystem can be provided in image space, proximate to the lens, where the image light emerges. In this location, image light directed to any given field point on the display surface is convergent, but can appear collimated. The deflector subsystem can include a tilted optical plate that is rotated in a plane along an axis. As the deflector subsystem is temporally rotated, the image light to any given field point traverses different optical paths, varying the angular diver- (Continued)

sity to reduce perceivable speckle by changing at least the angle of incidence to the screen.

29 Claims, 18 Drawing Sheets

(56) References Cited

U.S. PATENT DOCUMENTS

| | | | | |
|---|---|---|---|---|
| 6,094,181 | A * | 7/2000 | Hildebrand | G02B 27/0172 345/8 |
| 2006/0023164 | A1 * | 2/2006 | Sakaguchi | H04N 5/7458 353/20 |
| 2006/0028961 | A1 | 2/2006 | Kim et al. | |
| 2006/0033009 | A1 * | 2/2006 | Kobayashi | G02B 27/48 250/208.1 |
| 2007/0019921 | A1 * | 1/2007 | Yonekubo | G03B 21/006 385/147 |
| 2007/0223091 | A1 | 9/2007 | Lee | |
| 2007/0273849 | A1 * | 11/2007 | Takeda | G02B 5/0242 353/122 |
| 2008/0111973 | A1 * | 5/2008 | Aruga | G03B 21/208 353/20 |
| 2008/0198334 | A1 * | 8/2008 | Kasazumi | G03B 21/10 353/38 |
| 2009/0016061 | A1 * | 1/2009 | Chen | G03B 21/2033 362/284 |
| 2009/0040467 | A1 * | 2/2009 | Yamauchi | G02B 27/48 353/38 |
| 2009/0284713 | A1 * | 11/2009 | Silverstein | G02B 27/48 353/8 |
| 2010/0296061 | A1 * | 11/2010 | Silverstein | G02B 27/48 353/31 |
| 2010/0315597 | A1 | 12/2010 | Powell et al. | |
| 2010/0321639 | A1 * | 12/2010 | Silverstein | G02B 27/48 353/30 |
| 2011/0285967 | A1 * | 11/2011 | Gollier | G02B 27/48 353/20 |
| 2012/0013855 | A1 * | 1/2012 | Lescure | G03B 21/2033 353/81 |
| 2012/0099612 | A1 * | 4/2012 | Deubel | G02B 5/1861 372/26 |
| 2013/0222875 | A1 | 8/2013 | Chifu et al. | |
| 2015/0198802 | A1 | 7/2015 | Ando et al. | |

FOREIGN PATENT DOCUMENTS

| | | |
|---|---|---|
| CN | 201845132 | 5/2011 |
| CN | 102483523 | 5/2012 |
| CN | 102640037 | 8/2012 |
| CN | 102906630 | 1/2013 |
| EP | 0631156 | 12/1994 |
| JP | 07139906 | 6/1995 |
| JP | 2003021806 | 1/2003 |
| JP | 2006189700 | 7/2006 |
| JP | 2009169012 | 7/2009 |
| JP | 2013531806 | 8/2013 |
| JP | 2013254031 | 12/2013 |

OTHER PUBLICATIONS

International Patent Application No. PCT/IB2016/050886, International Search Report and Written Opinion dated May 12, 2016, 15 pages.
CN201680008832.5 , "Office Action", dated Jul. 3, 2019, 17 pages.
Chinese Application No. CN201680008832.5 , "Office Action", dated Mar. 3, 2020, 18 pages.
Japanese Application No. JP2017-543397 , "Office Action", dated Feb. 25, 2020, 9 pages.
Chinese Application No. CN201680008832.5 , Office Action, (English machine translation provided), dated Jul. 21, 2020, 25 pages.
Japanese Application No. JP2017-543397 , Office Action, dated Sep. 15, 2020, 10 pages.
Chinese Application No. CN201680008832.5 , Office Action, dated Jul. 21, 2020, 12 pages.
Japanese Application No. JP2017-543397 , Office Action, dated Sep. 15, 2020, 5 pages.

* cited by examiner

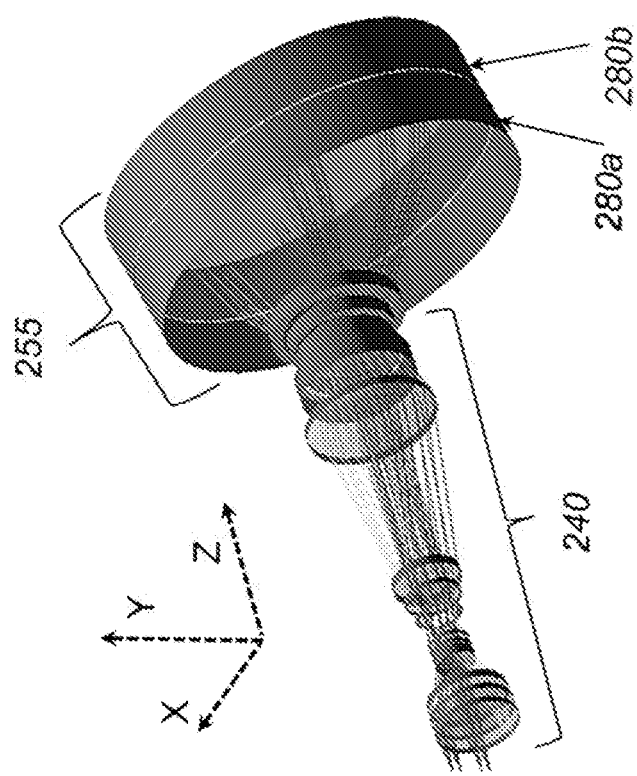
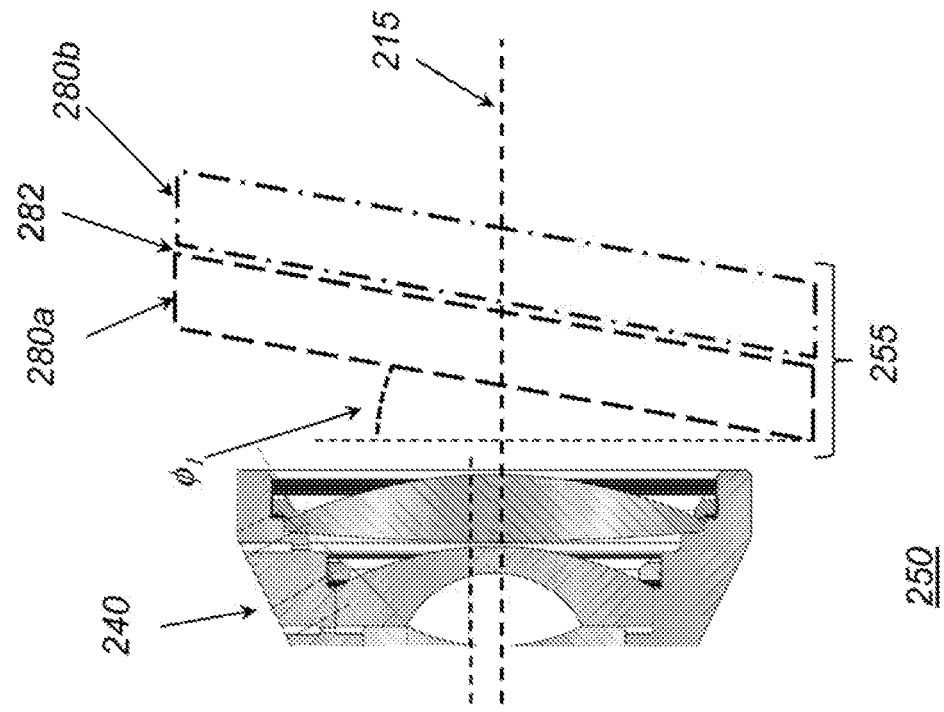
FIG. 15

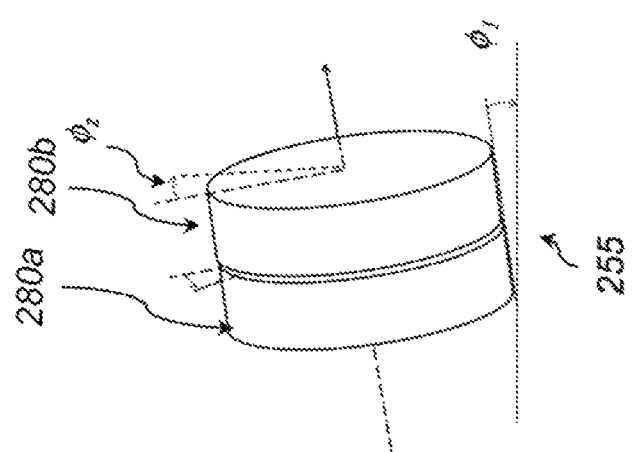

DESPECKLING SYSTEM FOR PROJECTED LIGHT

CROSS-REFERENCE TO RELATED APPLICATION

This is a U.S. national phase under 35 U.S.C. 371 of International Patent Application No. PCT/IB2016/050886, titled "Despeckling System for Projected Light" and filed Feb. 18, 2016, which claims the benefit of U.S. Provisional Application No. 62/117,756, titled "Despeckling Device for Modifying Projected Image Light" and filed Feb. 18, 2015, each of which is incorporated herein by reference in its entirety.

TECHNICAL FIELD

The present disclosure generally relates to optical systems and, more specifically but not exclusively, to reducing the visibility of speckle artifacts that otherwise occur during projection of coherent or partially coherent light to a target surface.

BACKGROUND

Laser projection technology is rapidly evolving from high cost and complexity of the laser sources, particularly in the green and blue spectral bands, to mature and cost competitive options for image display. The potential benefits expected from laser projection, including the larger color gamut, more vivid, saturated and brighter colors, high contrast, and low cost optics are increasingly being realized.

But the presence of laser speckle artifacts, which are rapidly varying spatial intensity fluctuations, caused by interference of coherent light in reflection from the screen, is a continuing problem. In particular, with speckle, incident coherent light interacts with the random roughness of optical surfaces on the order of a wavelength of light. As the light reflects, the roughness creates randomly phased sub-sources, which interfere together. The resulting random intensity fluctuations, which are speckle noise, lower the effective quality of an image, in particular at the higher frequencies essentially producing a "shimmer effect" that can be both distracting and reduce the effective resolution of the projector. While speckle can occur when using light sources other than lasers, due to their high degree of coherence, lasers may provide the most pronounced effects.

In the case of cinema, speckle occurs from interfering multi-directional reflections off light scattering features on the screen surface. Strategies for speckle reduction include modifying the spatial or temporal coherence of the illumination, superimposing a number of uncorrelated speckle patterns onto each other, or modifying its polarization state. One method provides vibration or oscillatory movement of the display screen; and with oscillation above a threshold speed, perceived speckle can be significantly reduced. Other methods include broadening the spectral line width of the laser illumination and reducing the spatial coherence by using static and oscillating diffusers or oscillating fibers or by vibrating various optical components in the path of illumination or imaging light. Some approaches to reducing speckle noise include increasing polarization diversity, increasing wavelength diversity, providing increased angular diversity (e.g., by using a moving diffuser), or by providing increased spatial diversity (e.g., by screen shake). Typically, multiple techniques are used in combination to achieve an acceptably reduced speckle visibility.

As an example, U.S. Pat. No. 5,272,473, entitled "Reduced-Speckle Display System" by Thompson et al. provides a coherent light projection system in which a transducer is coupled to the display screen to provide screen vibration with acoustic waves. As screen vibration reduces speckle visibility by temporal averaging across scatterers, variations in screen tension over time, temperature, and position, can cause the speckle reduction quality to vary.

As another example, U.S. Pat. No. 7,116,017 to Ji et al., entitled "Device for reducing deterioration of image quality in display using laser," provides an axially vibrating mirror device located in the light path between the laser and the screen. As the mirror vibrates axially, the incident position of the light to the screen changes, and spatial diversity is increased to reduce speckle visibility, improving image quality. However, the motion of the image across the screen would also create image dither that reduces image resolution.

Typical solutions for increasing spatial or angular diversity of light incident to a display surface to reduce speckle visibility also cause significant image resolution loss. As speckle presents a recurring problem in laser projection systems, there is a remaining need for improved speckle compensation mechanisms that significantly reduce speckle visibility, but that also limit accompanying degradations in image quality.

SUMMARY

In one example, a system for reducing speckle artifacts is provided. The system includes a light source, a lens, and a deflector subsystem with an optical axis. The light source is configured to emit light that is at least partially coherent. The lens is configured to output the light as a convergent light beam towards a location on a target surface. The deflector subsystem is positionable between the lens and the target surface. The deflector subsystem includes an optical element that is rotatable about the optical axis to temporally and angularly deflect the convergent light beam through angular orientations toward the location on the target surface.

In another example, a device for reducing speckle artifacts is provided. The device includes at least one optical plate, a housing, and an actuator. The optical plate has an inner surface and an outer surface through which to transmit light. The inner surface and the outer surface are non-parallel to each other by a wedge angle. The actuator is configured for rotating the optical plate at a rotational velocity about an axis that is parallel to the optical axis to deflect, angularly and temporally, a beam of light that is incident to the inner surface and that emerges from the outer surface and directed to a given location on a display surface.

In another example, a method is provided for reducing speckle artifacts. At least partially coherent light is directed by a lens as a convergent light beam towards a location on a target surface. The convergent light beam is deflected, by an optical element that is in a deflector subsystem with an optical axis and that rotates about the optical axis, temporally and rotationally through angular orientations to remain convergent towards the location on the target surface for the angular orientations and reduce speckle artifacts.

BRIEF DESCRIPTION OF THE DRAWINGS

FIG. 15 depicts details of an arrangement of a tilted optical plate of a refractive speckle reduction assembly according to one example.

FIG. 16 depicts a side perspective view of a tilted optical plate of a refractive speckle reduction assembly according to one example.

DETAILED DESCRIPTION

Figure 1:
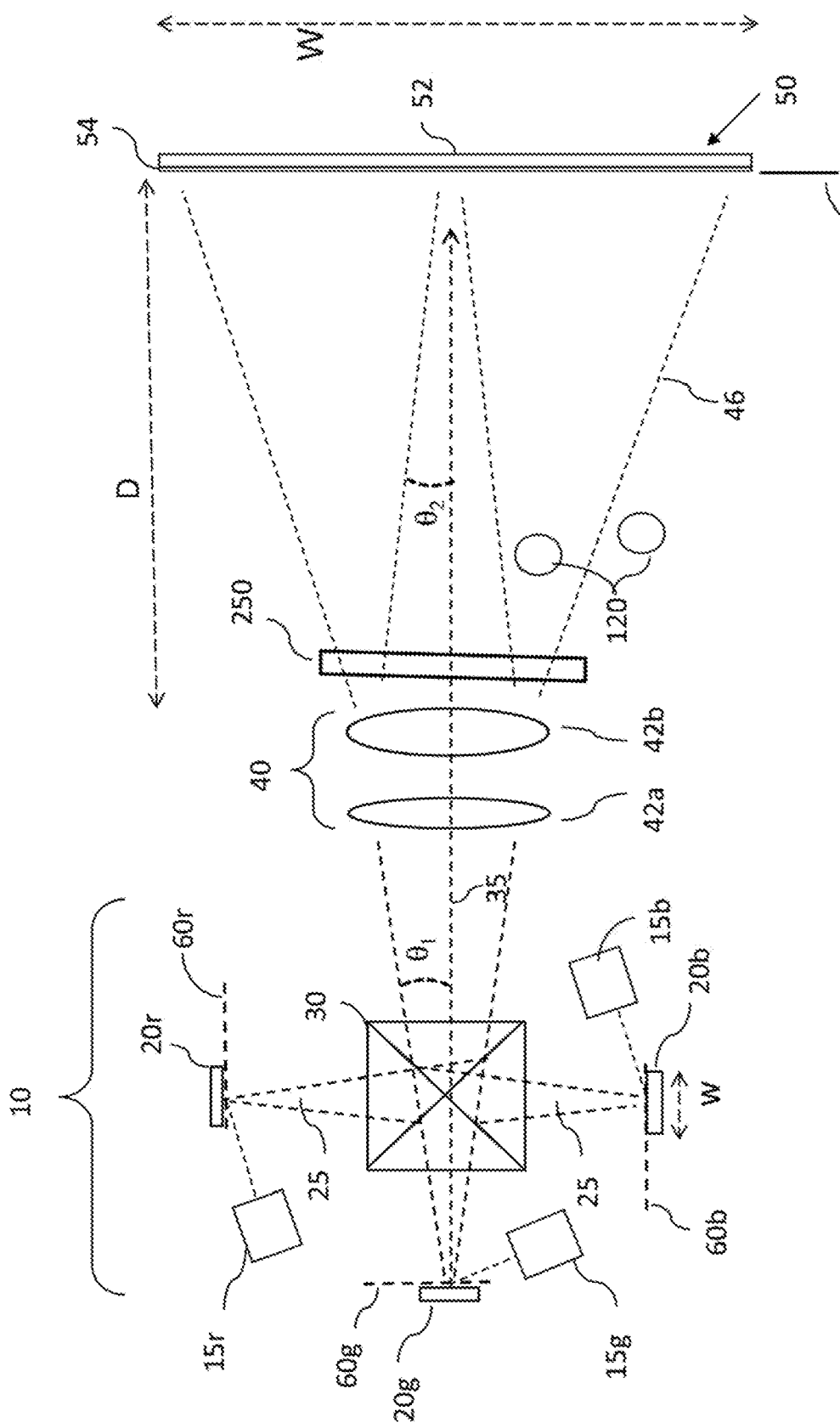
FIG. 1 schematically depicts part of a projection system with a refractive speckle reduction assembly according to one example.

For the detailed description that follows, elements not specifically shown or described may take various forms. Figures shown and described herein are provided to illustrate principles of operation and component relationships along their respective optical paths according to certain examples of the present disclosure and may not show actual size or scale. Some exaggeration may be necessary to emphasize structural relationships or principles of operation. In some cases, components that normally lie in the optical path of the projection apparatus are not shown to describe the operation of projection optics more clearly. Further, and unless otherwise explicitly noted or required by context, the word "or" is used in this disclosure in a non-exclusive sense.

Certain aspects and features of the present disclosure relate to a deflector subsystem with an optical element that can be rotated to increase angular diversity of light deflected by the deflector subsystem and reduce speckle artifacts when the light is displayed. An example of the optical element is an optical plate that can be rotated by a motor or other actuator about an axis. The optical element may also be tilted. In the case of a projection system, image dither, which is a temporally varying spatial displacement or positional deviation of image light to the target surface, can also be controlled by the deflector subsystem. The deflector system can be positioned in image space between a projection lens and a display surface to deflect convergent light beams through angular orientations toward a location on the display surface that result in reduced speckle.

A "deflector subsystem" as used herein may also be referred to as a "despeckling device," "despeckling system," or as a "refractive speckle reduction assembly." In one example, a deflector subsystem includes an optical plate that can rotate and have a tilt angle, a wedge angle, or a curved portion for deflecting light to reduce the visibility or perceptibility of speckle. For example, a deflector subsystem can deflect convergent cones of light to create a composite beam as the plate rotates that is incident to the display surface. As a result from increased angular diversity and temporal averaging of different speckle patterns produced by varying coherent interactions with scatterers on the screen, the spatial coherence of the image light is modulated, the speckle is temporally averaged, and speckle contrast is reduced. Image dither produced by the rotating optical plate can be controlled using parameters such as the amount of the wedge angle and the curvature of the optical plate to limit image resolution loss from image blur. A small amount of image dither can remain, which can further reduce speckle by modulating a spatial coherence of the image light and temporally averaging over multiple scatters. Rotating the optical plate can vary the optical path length of image light by causing optical path differences as compared to rotational position to vary the temporal coherence of the image light and reduce speckle.

The amount of speckle reduced can be based on a number of parameters of a deflector subsystem. Examples of the parameters include the effective F#, a glass thickness, tilt angle, and refractive index of the tilted optical plate, a wobble of the tilted optical plate, a motor or tilted optical plate velocity, and an amount of image dither. The amount of remaining image dither can also be based on a number of parameters of the deflector subsystem. Examples of such parameters include a wedge angle on an inner or outer optical surface, a curvature on an inner or outer optical surface, a curvature on each of the inner and outer optical surfaces, a positioning of a surface of least dither to the display surface, and a wobble of the tilted optical plate.

The term "f-number" (or F# or F/#) as used in the present disclosure is the ratio of the effective focal length to acceptance aperture diameter (F#=EFL/D). F-numbers are used to scale the width of a convergent-to-divergent cone of light such that the smaller the F#, the larger the cone is angularly, and the greater the light carrying capacity of that cone of light. In general, relative to the optical system, the f-numbers discussed refer to the f-number for light collected by the projection lens (e.g., from the intermediate image plane) or the f-number for light incident to the display surface. The term "numerical aperture" is also used, and is twice the inverse of the F# (NA=1/(2*F#)). The numerical aperture is calculated directly using the angle (θ) described by light going from the base of the object to the edge of the limiting aperture (the aperture stop) [NA=sin (θ)≈θ (in radians)]. Collectively, the f-number and numerical aperture define the speed of an optical system such as a projection lens. For example, the larger the NA or smaller the F#, the larger the cone is angularly, and the greater the light carrying capacity or optical speed of the optics conveying that cone of light.

Speckle is a spatial noise that can be quantified in terms of speckle contrast, C, given in equation (1) in percent (%) as:

$$C = 100\left(\frac{I_{std}}{I_{mean}}\right) \quad (1)$$

where $I_{std}$ is a standard deviation of intensity fluctuation about a mean intensity $I_{mean}$. The speckle contrast for fully developed speckle is 100%. Speckle appears as a collection of localized, irregular bright spots of light, distributed in, and separated by, a dark surround. Speckle occurs from localized constructive and destructive interference of the coherent or partially coherent light with a rough or structured surface. Prominent speckle can significantly degrade projected image quality for either a human observer or camera, relative to the ability to resolve fine spatial detail otherwise provided by an imaging system. Speckle can also cause the levels of noise in an image to be visually annoying for human viewers. Without some form of correction, speckle can be sufficiently objectionable to render images made with coherent illumination unsuitable for display purposes.

One goal of speckle reduction technologies is to reduce the visibility of laser speckle, or the speckle contrast of Eq. 1. For example, when incoherent white light from a xenon arc lamp is directed to a matte screen, speckle is marginally visible with intentional effort by a viewer, and a speckle contrast of about 0.5% to 3.0% is typically measured, depending on the measurement set-up. Speckle contrast for a very coherent light source, such as 0.1 nm bandwidth laser light directed to a gained screen, can be 50% or more. As further benchmarks, when speckle is driven down to about 10%, it can be visible, though generally not objectionable for many viewers, and generally overlooked when image content is displayed. Alternately, when speckle is further reduced to about 3% to 6% levels, it can be visible, but perhaps not objectionable, and for most viewers may be forgotten once image content is displayed.

Speckle visibility depends directly on the relative coherence or incoherence of the light source(s). Source coherence can be estimated using a coherence length, a coherence interval, or a coherence volume—the product of coherence length and coherence interval. For example, the temporal coherence length ($l_c$) can be estimated as $l_c = \lambda_c^2/\Delta\lambda$, where $\lambda_c$ is the center wavelength and $\Delta\lambda$ is the bandwidth. In the case of an incoherent or white light visible source (e.g., a xenon lamp), an estimated coherence length is $l_c$=(550 nm)²/300 nm, or about 1 micron. For a partially coherent green LED source with a 50 nm bandwidth, $l_c$ can be about 6 microns. By comparison, for yet more coherent light sources, such as a green laser source with a 5 nm bandwidth, $l_c$ is about 0.06 mm, whereas a green laser source with a 0.01 nm bandwidth, has $l_c$ of about 30 mm. Although coherence can be a continuum, a deflector subsystem can be applied to coherent light sources with bandwidths Δλ≤1.5 nm or partially coherent light sources with bandwidths Δλ≤15 nm, although it may also be applied to situations with partially coherent sources with yet larger bandwidths.

In general, speckle reduction can be affected by numerous factors, including angle, polarization, and wavelength diversity, as reflected by equation (2), for a speckle reduction factor R:

$$R = R_p \cdot R_\Omega \cdot R_\lambda \quad (2)$$

where $R_p$ is a reduction provided by manipulating polarization diversity, $R_\Omega$ is a reduction provided by manipulating angular diversity, and $R_\lambda$ is a reduction provided by manipulating wavelength diversity (increasing bandwidth Δλ). A deflector subsystem can be used for manipulating angular diversity, although increasing spatial diversity can also be a contributor. The angular diversity reduction factor $R_\Omega$, can be estimated by equation (3):

$$R_\Omega = (\Omega_{proj}/\Omega_{det})^{1/2} \quad (3)$$

where $\Omega_{proj}$ denotes the solid-angle ($\Omega \approx NA^2$) of the projected or incident light to the screen and $\Omega_{det}$ is the solid angle of the output light that is sampled by the collection aperture, which can be an optical detector (camera) or eye. Depending on the speed of the imaging optics and the adaptation or pupil diameter of the viewer's eye, it can be possible to obtain an angular diversity contrast reduction factor of about 2 times to 8 times. Speckle visibility can also depend on other factors, including screen construction. In general, screens have rough display surfaces with randomly oriented scatterers to direct light back to the audience. The display surface can be reflective and used for front projection or transmissive (translucent) and used for rear projection.

In one example, angular diversity incident to the screen or display surface can be increased to reduce the visibility of speckle in the light emergent from that surface. For context, the schematic of FIG. 1 shows a first type of a projection system 100 with a deflector subsystem that is a refractive speckle reduction assembly 250 according to one example. The refractive speckle reduction assembly 250 is positioned between a projection lens 40 and a screen or display surface 50. The projection lens 40 can project projected light 46 downwards to form an image on the display surface 50. The display surface has a reflective layer 54 provided on a substrate 52. In some examples, the substrate 52 is made of a reflective material, such as on the top surface of the substrate. Viewers 120, who are positioned beneath the projected light 46, can view the projected image on display surface 50.

The projection system 100 has three or more color channels 10, which include red (R), green (G) and blue (B). The color channels 10 have respective light sources 15r, 15g, 15b, and corresponding spatial light modulators 20r, 20g, 20b. In one example, the spatial light modulators 20r, 20g, 20b are digital micro-mirror devices (DMDs), such as Digital Light Processor (DLP) spatial light modulators available from Texas Instruments, Inc. of Dallas, Tex. Modulated emergent light from each of the spatial light modulators 20r, 20g, 20b provides image light 25, which is then combined onto the same optical path, generally along an optical axis 35, using a combining element such as a dichroic combiner 30. This architecture can be used if the spatial light modulators 20r, 20g, 20b are of another technology, such as liquid crystal devices (LCDs), with liquid crystal on silicon (LCOS) devices being a specific example thereof.

Figure 2:
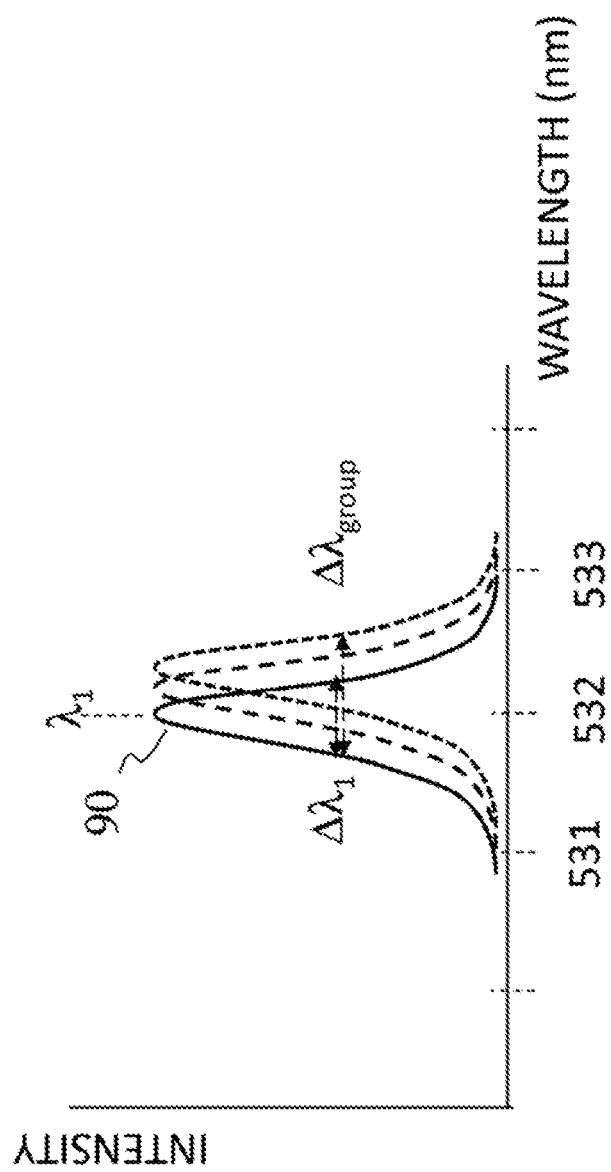
FIG. 2 is a graph showing an example emission spectrum for a single color channel in a projection system with a refractive speckle reduction assembly according to one example.

Each of the light sources 15r, 15g, 15b can be a narrow-band light source (such as a laser light source, an LED light source, or a superluminescent diode (SLEDs) light source) having a visible wavelength band with a peak wavelength and a bandwidth providing some amount of energy over a small range of nearby wavelengths. The graph of FIG. 2 illustrates an example of a wavelength band 90 corresponding to the emission spectrum of a representative laser used as an illumination source in a digital projector, such as that shown in FIG. 1. In this example, the laser is shown as a green laser, having peak wavelength $\lambda_1$ of 532 nm, but also having energy at wavelengths that are slightly to each side of this central value. The width of the wavelength band 90 has a bandwidth $\Delta\lambda_1$ (e.g., the full-width half (FWHM) maximum bandwidth). This same relationship can also apply for red and blue lasers over corresponding wavelength bands. Typical laser bandwidths $\Delta\lambda_1$ from individual lasers used in laser projectors can be in the range of 0.05 nm to 1 nm such that the lasers are coherent sources. FIG. 2 also depicts that a larger composite spectral bandwidth ($\Delta\lambda_{group}$) can occur when multiple laser devices, having similar but different individual spectra, are used together in combination to form a light source. This larger composite bandwidth can have a FWHM bandwidth $\Delta\lambda_{group}$ of 4 nm to 10 nm, depending on the lasers used, such that the aggregate is a partially coherent light source. Then for example, in green light, these bandwidths can be equivalent to coherence lengths of $l_c$=30-80 microns. Alternately, if one or more light sources are LEDs, spectral filters (not shown), such as dichroic filters, can be used to narrow the spectrum to this range.

Returning to FIG. 1, light emitted from the coherent or at least partially coherent light sources 15r, 15g, 15b is received into an image forming system, which in the case of FIG. 1, includes spatial light modulators 20r, 20g, 20b of width "w," a combining element (e.g., such as a dichroic combiner 30), and the projection optics (e.g., projection lens 40). Although light sources 15r, 15g, 15b, respectively, can each include a single high power laser light source, these light sources 15r, 15g, 15b can include multiple lasers that are combined onto a common optical path using free space optics or optical fibers. Each of the spatial light modulators 20r, 20g, 20b lies at an object plane 60r, 60g, 60b, respectively, of an element of the projection system 100, in this case, of projection lens 40. In addition, each of the spatial light modulators 20r, 20g, 20b is image conjugate to a displayed image plane, for example image plane 64 at display surface 50. Each of the spatial light modulators 20r, 20g, 20b includes an array of square display pixels (not shown), which are imaged by the projection lens 40 to the display surface 50 to form an array of on-screen projected image pixels. Each of the spatial light modulators 20r, 20g, 20b can create variable patterns of on-state or off-state display pixels that correspond to the incoming image data thereto at a given point in time. For cinema applications, the DMD display pixels can have a width "w" of 7.5 microns.

Image light 25 combined by the combiner 30 can reach the projection lens 40 that includes, in this case, a pair of lens elements 42a, 42b, which project images of the image content on an image plane 64 that is coincident with the display surface 50. The image light 25 becomes projected light 46 as it emerges from the projection lens 40. These projected images can be magnified by the projection lens 40 with a magnification m=W/w or m=$\theta_2/\theta_1$. Image plane 64 is a thin volume, corresponding to the height and width of the overall image projected onto the display surface, but whose depth is defined by a depth of field in which the image is in focus with adequate image quality. Typically, the "plane of best focus" is a curved "surface" having a contour that can follow the curvature of off-axis aberrations such as field curvature or astigmatism. The display surface 50 can also be curved (and superior image quality can occur if the display surface curvature generally matches the best image quality "surface" curvature. Projected image quality can depend on numerous factors, including image resolution, speckle visibility, color rendering and metameric failure, modulator artifacts (e.g., the screen door effect), image rendering artifacts, screen artifacts, and light source variations.

Figure 4:
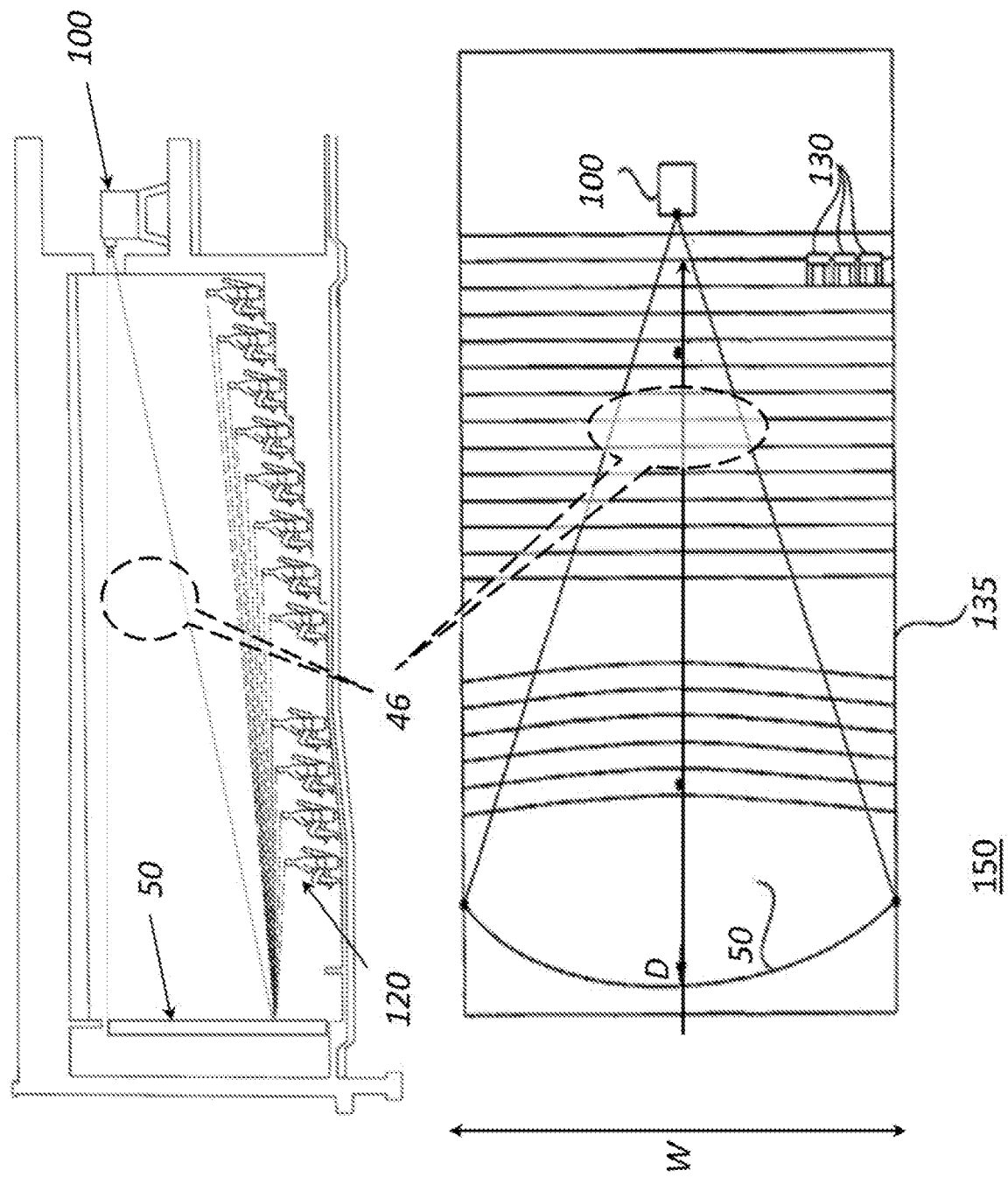
FIG. 4 depicts top and side views of a cinematic theatre that includes a projection system with a refractive speckle reduction assembly according to one example.

The projection system 100 can be used in a theater, such as theater 150 depicted schematically in FIG. 4. In addition to the projection system 100, the theater 150 includes seats 130, aisles 135, and viewers 120. The projector system 100 directs image light 46 downwards to a display surface 50. To enable this downwards projection, image light can be projected in an offset manner through the projection lens 40 of FIG. 1, or the projector system 100 can be tilted, or a combination thereof. In the case that offset of the vertical field relative to the lens optical axis is used, the projection lens 40 in FIG. 1 can be designed to image a larger area than is used by the object (e.g., the DMD) itself. This vertical field offset can be as much as 27.5% of the full field height. Although display surface 50 can be a wall, it is typically a front-projection screen from which image light scatters back towards the viewers 120. The screen can also be tilted, with the bottom edge either closer to, or further from, the audience. Screen surface properties (screen gain), screen tilt, and screen curvature, can affect how light is directed towards the audience. This screen has a width "W," and is located a distance "D" from the projector. In the cinematic field, distance "D" is the "throw," and the throw ratio (T) can be defined as the ratio of the screen throw (distance D) to the screen width (W), such that T=D/W. For example, theatre throw distances can fall in a 40-110 ft. range, and theatre throw ratios can fall in a range 0.7≤T≤2.0.

During operation of the coherent light projection system 100, the spatial light modulators 20r, 20g, 20b, as shown in FIG. 1, can interact with the at least partially coherent light emitted from the light sources 15r, 15g, 15b, in a manner consistent with image data, such as image data representing an image frame in a movie or video. In this regard, control signals are provided to the spatial light modulators 20r, 20g, 20b by a data processing system (not shown). In particular, the spatial light modulators 20r, 20g, 20b can include two-dimensional arrays of addressable modulator pixels (not shown) that modulate incident light in accordance with the image data signals. Light modulation can be provided by a variety of mechanisms, including redirection by tilting of micro-mirrors (DLP), polarization rotation (LCOS or LCD), light scattering, absorption, or diffraction. Operating the spatial light modulators 20r, 20g, 20b on the incident light can produce at least partially coherent image light.

Typically in such projection systems 100, a long working distance is needed, as light from multiple spatial light modulators 20r, 20g, 20b is combined via combiner 30 before being projected to the distant display surface 50 by the projection lens 40. For improved light efficiency, it can be useful to have projection lens 40 operate at a small F# (e.g., F/2.5) to capture the image light 25 emergent from the spatial light modulators 20r, 20g, 20b. However, as the projection lens 40 increases in size to capture this light, it also becomes increasingly expensive and complicated. Moreover, peak image quality (e.g., for resolution, as measured by the modulation transfer function (MTF) typically occurs for slower imaging conditions (e.g., ~F/5). Laser systems, including projectors, are often advantaged relative to lamp based systems, as the coherence and small etendue of the emitted light means it is easier to direct high optical flux through small apertures or larger F# imaging systems. However, it is this same coherence that leads to laser speckle as it allows optical interference to occur as the coherent light interacts with the target surface.

Speckle visibility can be reduced by increasing the angular diversity reduction factor $R_\Omega$ or the projected solid angle $\Omega_{proj}$. With respect to FIG. 1, convergent light can be delivered to the display surface 50 with a large angular width (large numerical aperture ($\Omega_{proj.} = NA_{screen}^2 = \sin^2(\theta_2) \approx \theta_2^2$)). However, speckle reduction can then mean that the angular width of the light on the modulator side is also large, or has a low F# (e.g., F/3 or lower). Thus, the desire to reduce potential speckle visibility is in conflict with the preference to reduce projection lens complexity, size, and cost. As a remedy, projector system 100 can be equipped with the refractive speckle reduction assembly 250 that can have a rotating optical element for increasing angular diversity of convergent light.

Figure 3:
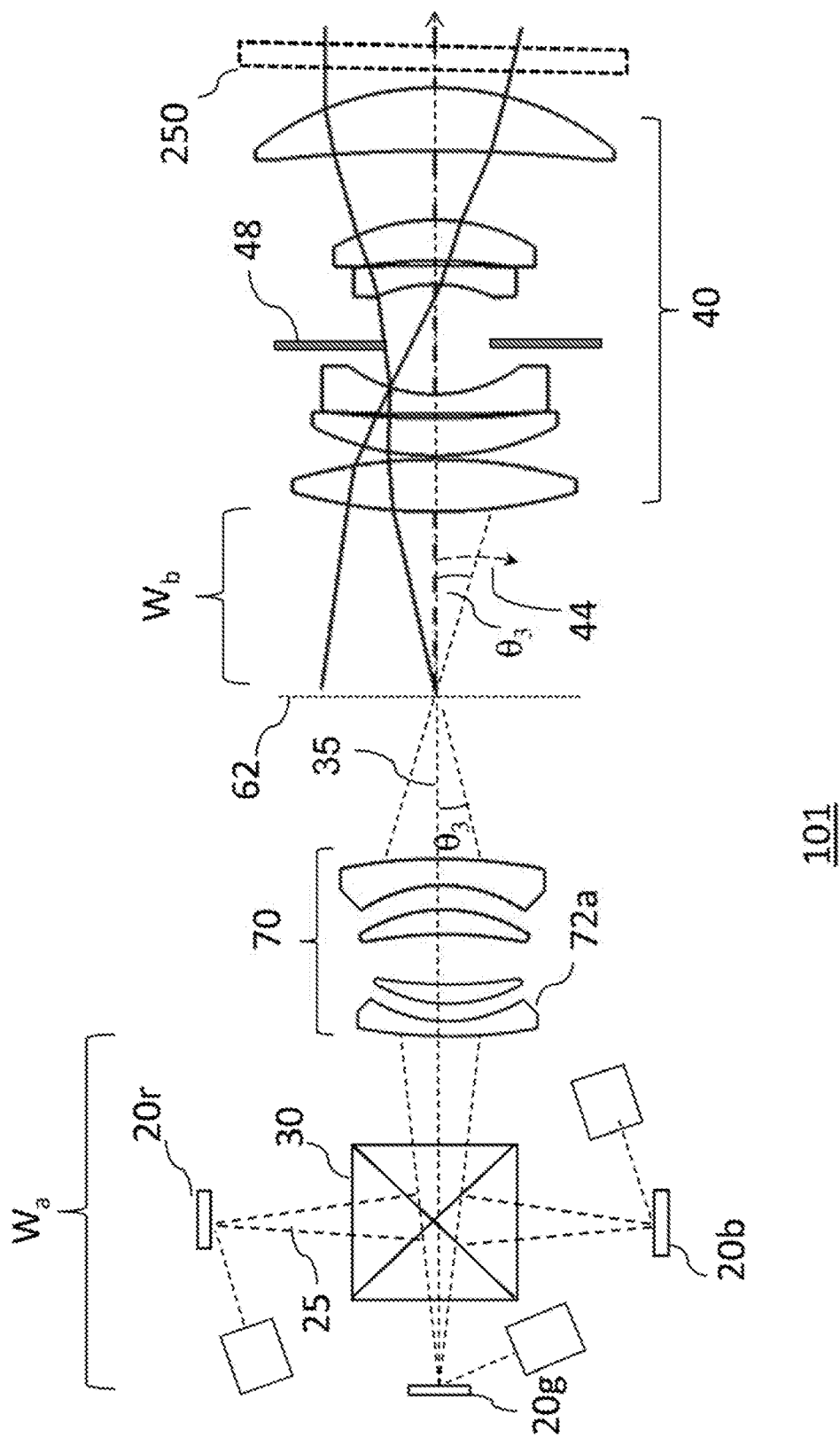
FIG. 3 schematically depicts part of a projection system with a refractive speckle reduction assembly for providing reduced speckle according to another example.

FIG. 3 schematically depicts another example of a projection system 101 that can also be used in a theater 150 of FIG. 4 in place of projection system 100. In this projection system 101, image light 25 passing through dichroic combiner 30 is directed through a relay lens 70 that includes at least one relay lens element 72a. The relay lens 70 is positioned to have each of the spatial light modulators 20r, 20g, 20b as objects that are image conjugate to an intermediate image formed at an intermediate image plane 62. Relay lens 70 focuses image light 25 at an F# described by an angle $\theta_3$ with respect to optical axis 35 toward intermediate image plane 62. The resulting intermediate image is an aerial real image that can be viewed if a screen or other display structure were placed at the intermediate image plane 62. A relay lens 70 operating at small magnifications (1× to 2×) with long working distances $W_a$ can be easy to design and fabricate. Likewise, use of relay lens 70 can also allow the projection lens 40 to have a small working distance $W_b$, which can be useful, given the typically large magnification. In this projection system 101, the projection optics is a multi-element projection lens 40, with an aperture stop 48, that then reimages the intermediate image to a distant display surface.

The aerial intermediate image can include an array of intermediate image pixels that are pixel images of the modulator pixels of spatial light modulators 20r, 20g, 20b. In particular, the intermediate image pixels can include overlapped and aligned images of corresponding pixel images from the spatial light modulators 20r, 20g, 20b. The corresponding imaged modulator pixels can be co-aligned to within one-quarter pixel error or better across the entire intermediate image at intermediate image plane 62. In some examples, a moving diffuser can be located at the intermediate image plane 62 to aid with speckle reduction by increasing angular diversity in spreading light into an f-number 44 for an angle $>\theta_3$, but with significantly reduced image resolution (MTF) and increased size and cost for the projection lens 40. The projector system 101 can be equipped with refractive speckle reduction assembly 250 to provide an improved construction and performance, while reducing speckle.

Figure 5:
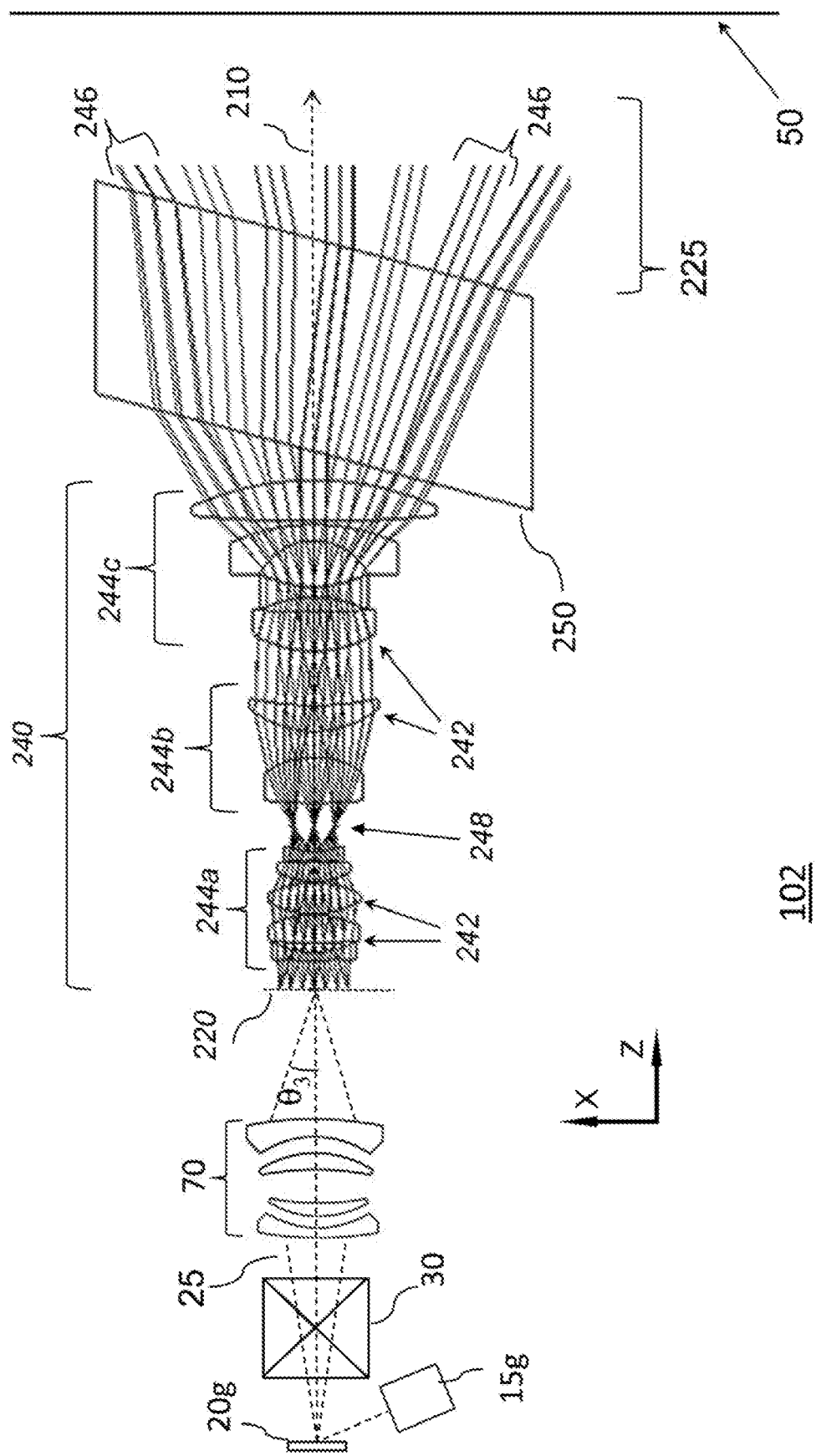
FIG. 5 schematically depicts part of a projection system with a refractive speckle reduction assembly according to another example.
Figure 6:
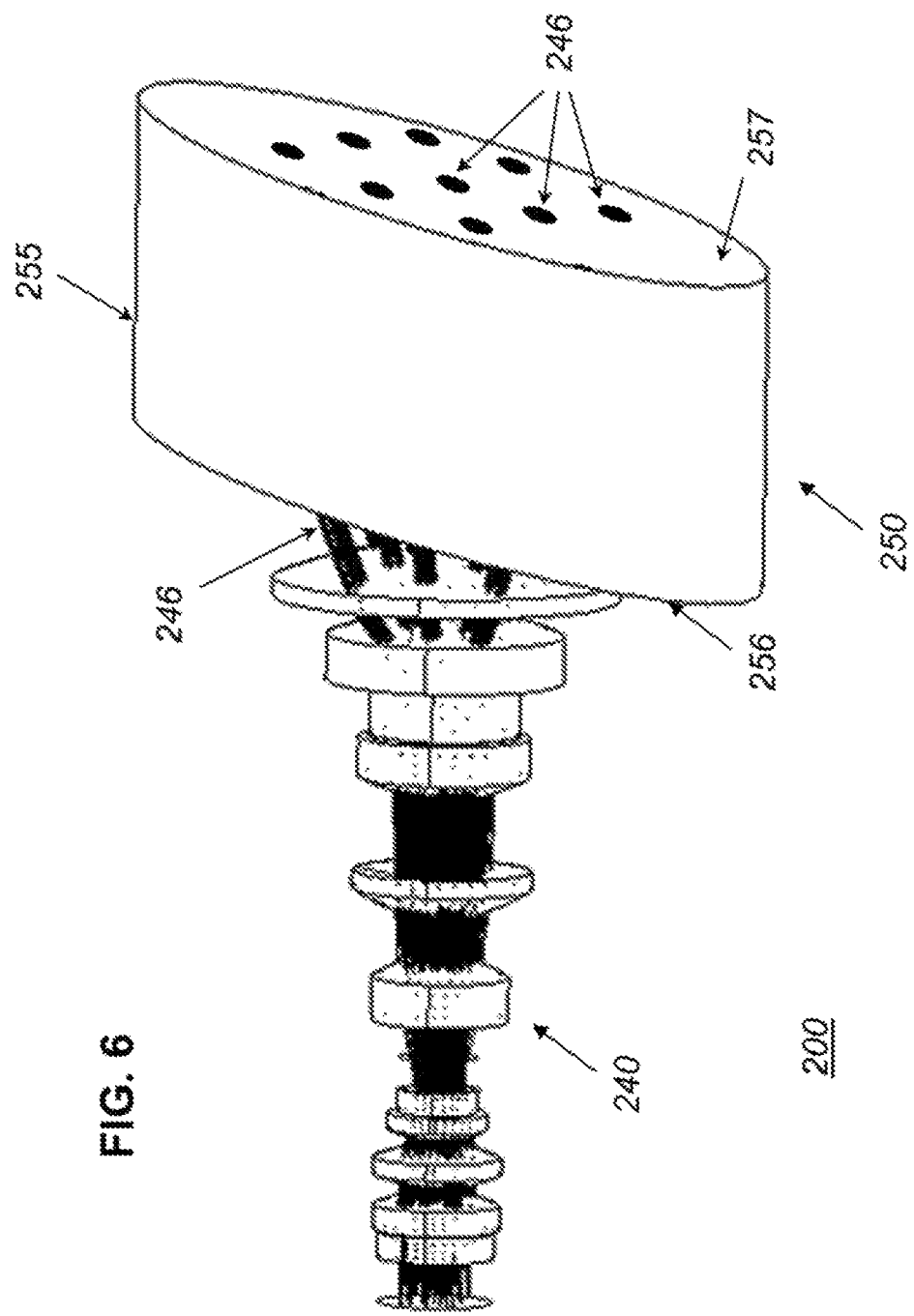
FIG. 6 depicts a side perspective view of a projection lens and a refractive speckle reduction assembly with image light propagating therethrough according to one example.

A refractive speckle reduction assembly according to some examples can be positioned in image space between the projection lens and a display surface, and can increase the angular diversity of the image light, in combination with temporal averaging, to reduce speckle. Speckle reduction is based on averaging N independent speckle configurations within the spatial and temporal resolution of the detector (the eye or the measuring camera). FIG. 5 schematically depicts an example of a projection system 102 with a relay lens 70 to image the at least partially coherent image light 25 from a combiner 30, one or more spatial light modulators (e.g., spatial light modulator 20g), and light sources (e.g., light source 15g) to form an intermediate image at an intermediate image plane. Projection lens 240 can be aligned so that intermediate image plane is also the object plane 220 for the projection lens 240. Projection lens 240 can then re-image the aerial real image at object plane 220 to a distant target surface or display surface 50, with image light beams 246 of image light generally propagating in the "Z" direction and focusing to form image pixels at given field points on the display surface 50. As a result, display pixels on the spatial light modulators are imaged to provide projected image pixels (or screen pixels) at the display surface 50. As shown in FIG. 5, these image light beams 246 focus through a deflector subsystem, such as the refractive speckle reduction assembly 250 positioned proximate (e.g., offset 5 mm to 20 mm therefrom) to the projection lens 240. The refractive speckle reduction assembly 250, which is a despeckling device, is located in a screen-side image path location in image space 225, between the projection lens 240 and display surface 50. The refractive speckle reduction assembly 250 can include an optical element, such as a tilted optical plate with an inner surface and an outer surface, where one surface is wedged or tilted relative to the other. The refractive speckle reduction assembly 250 is rotated about a mechanical axis parallel to, or co-linear with, the optical axis 210 by a motor mechanism. The rotation axis of the tilted optical plate can be an axis that is not parallel to, or co-linear with, an axis nominally perpendicular to either the inner surface or outer surface.

From the point of view of the relay lens 70, spatial light modulators (e.g., spatial light modulator 20g) are examples of objects for which image light 25 is conditioned to form a real aerial image at an intermediate image plane that is at an object plane 220. For example, from the point of view of the projection lens 240, this real aerial image is now the object residing at the object plane 220, and a distant display surface (not shown) at the display surface 50 resides in image space 225. Image space 225 is the distance (e.g., the throw "D") between the projection lens 240 and the screen or the display surface 50. Also as shown in FIG. 5, the a projection lens 240 includes projection lens elements 242 arranged in three groups of lens elements 244a, 244b, 244c, about an aperture stop 248. Despeckling devices can be used in combination with imaging optics or projection optics of various types. For example, the projection lens 240 can have alternate arrangements of lens elements and lens groups than those that are shown. Although both relay lens 70 and projection lens 240 are depicted as including refractive lenses, in other examples one or both of these functions can be provided by mirror-based systems, such as an Offner relay or a three-mirror anastigmatic telescopic projection optics system, or by using catadioptric designs having both refractive and reflective elements. Projection lens 240 can also directly image one or more spatial light modulators, or some other type of object to the display surface 50, through refractive speckle reduction assembly 250, without using relay optics.

FIGS. 6-10 depict certain examples of a refractive speckle reduction assembly 250 and using the refractive speckle reduction assembly 250, according to some aspects. As shown in the projection subsystem 200 in FIG. 6, at least partially coherent image light, represented by emergent image light beams 246 can be intercepted and redirected by an optical element, such as the tilted optical plate 255, of an example of a refractive speckle reduction assembly 250. In particular, the image light beams 246 can emerge from the projection lens 240 and enter the tilted optical plate 255 through an inner surface 256 of the tilted optical plate 255, refracting towards an optical axis, to then transit the glass thickness, and exit outer surface 257. Each outgoing image light beam 246 then illuminates a small, spot-like area on the outer surface 257 (screen side) of the tilted optical plate 255. Each image light beam 246 then propagates to a distant target surface (e.g., display surface 50 in FIG. 5), travelling along an optical path nearly identical to the original optical path if the refractive speckle reduction assembly 250 was not present. Inner surface 256 and outer surface 257 can be coated with anti-reflection (AR) optical thin films.

Then as the tilted optical plate 255 of the refractive speckle reduction assembly 250 rotates, at any point in time, or any given rotational position of the tilted optical plate 255, a given image light beam 246 that is directed to a given screen location is deflected in different directions to propagate through the thickness of the plate 255. As the tilted optical plate 255 rotates through a revolution or the rotational time period, any given outgoing image light beam 246 is rotationally shifted and traces out a closed path on the outer surface 257 that varies in shape (e.g., circular or elliptical) depending on the beam location on the outer surface 257. At any point in time, or any given rotational position of the tilted optical plate 255, image light for a given screen position, as represented by an image light beam 246, can converge to that same nominal screen location regardless of the position of the light beam on the outer surface 257.

Figure 7:
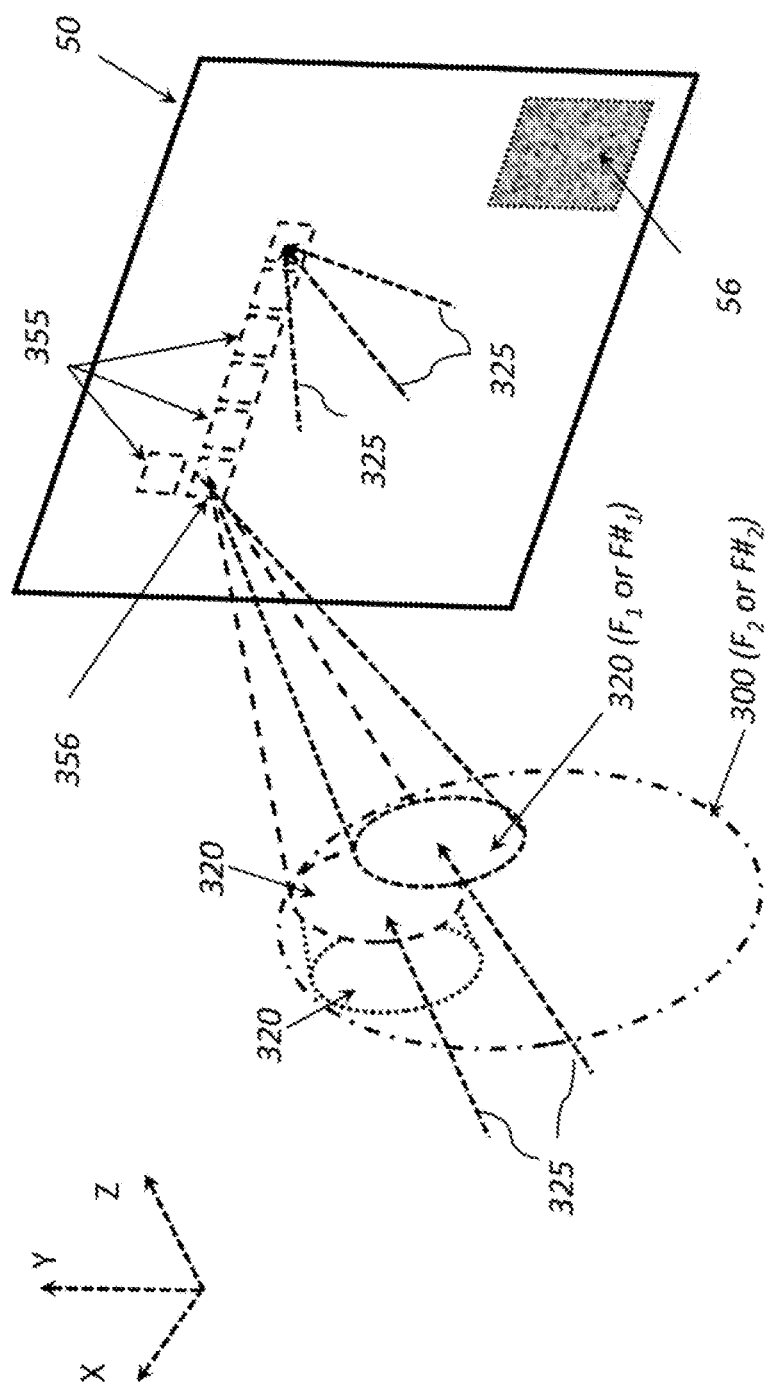
FIG. 7 depicts aspects of the incidence of image light to the display surface as modified by a refractive speckle reduction assembly according to one example.

Optically, image light beams 246 can be convergent cones of image light, focused at or near the display surface, which can have scatterers to redirect light back to the audience. Because of the high magnification (e.g., 400×), the cones can converge towards the screen at slow rates (e.g., F/3000) to approximate collimated beams relative to the aberration impact on them of propagating through the tilted optical plate 255. As shown in FIG. 7, a convergent cone 320 for an image light beam propagates generally in the "Z" direction from a refractive speckle reduction assembly to form an image pixel 355, which is a projected image pixel (or screen pixel) of a given display pixel of a spatial light modulator, as seen at a local area on the display surface 50 that includes scatterers 56. However, as the tilted optical plate of the refractive speckle reduction assembly is rotated, and an image light beam is swept through a closed path, the corresponding convergent cones 320 are deflected by the optical plate and then are incident to a given image pixel 356 on the display surface 50 at different angles of incidence 325. In aggregate, the convergent cones 320 of light, as the convergent cones 320 are rotationally shifted or swept through time and angle, then define a composite beam 300 of light propagating generally in the "Z" direction towards a screen location or given image pixel 356. This cone can be generally annular, with the size (NA or F#) of the convergent cone 320 or associated image light beam determining how filled in the center of the annular light path is with light. These annular cones and closed paths can be more or less circular or elliptical, depending on their transiting location through the refractive speckle reduction assembly.

With the refractive speckle reduction assembly present, the composite beam 300 provides can provide faster effective f-number ($F\#_2$) or larger projection numerical aperture ($NA_{screen}$) or solid angle ($\Omega_{proj}$) at which light is locally directed or aimed to the screen surface. This can be equivalent to increasing the angular diversity by varying the angular orientation of the image light, or modulating the spatial coherence of the image light, to the display surface 50, and thus the operation of the refractive speckle reduction assembly can decrease speckle contrast and perceptibility. Assuming the detection solid angle $\Omega_{det}$ is constant, then the angular diversity reduction factor $R_\Omega$ increases because projected solid angle $\Omega_{proj}$ is increased. Equivalently, this can be explained that speckle reduction is enhanced as the number N of temporally averaged independent speckle configurations increases, where N measures the increased angular diversity increases, according to $N \approx R_\Omega = NA_{screen}^2 / NA_{det}^2$, where $NA_{det}$ quantifies the cone collected by the eye or measurement camera.

Figure 8:
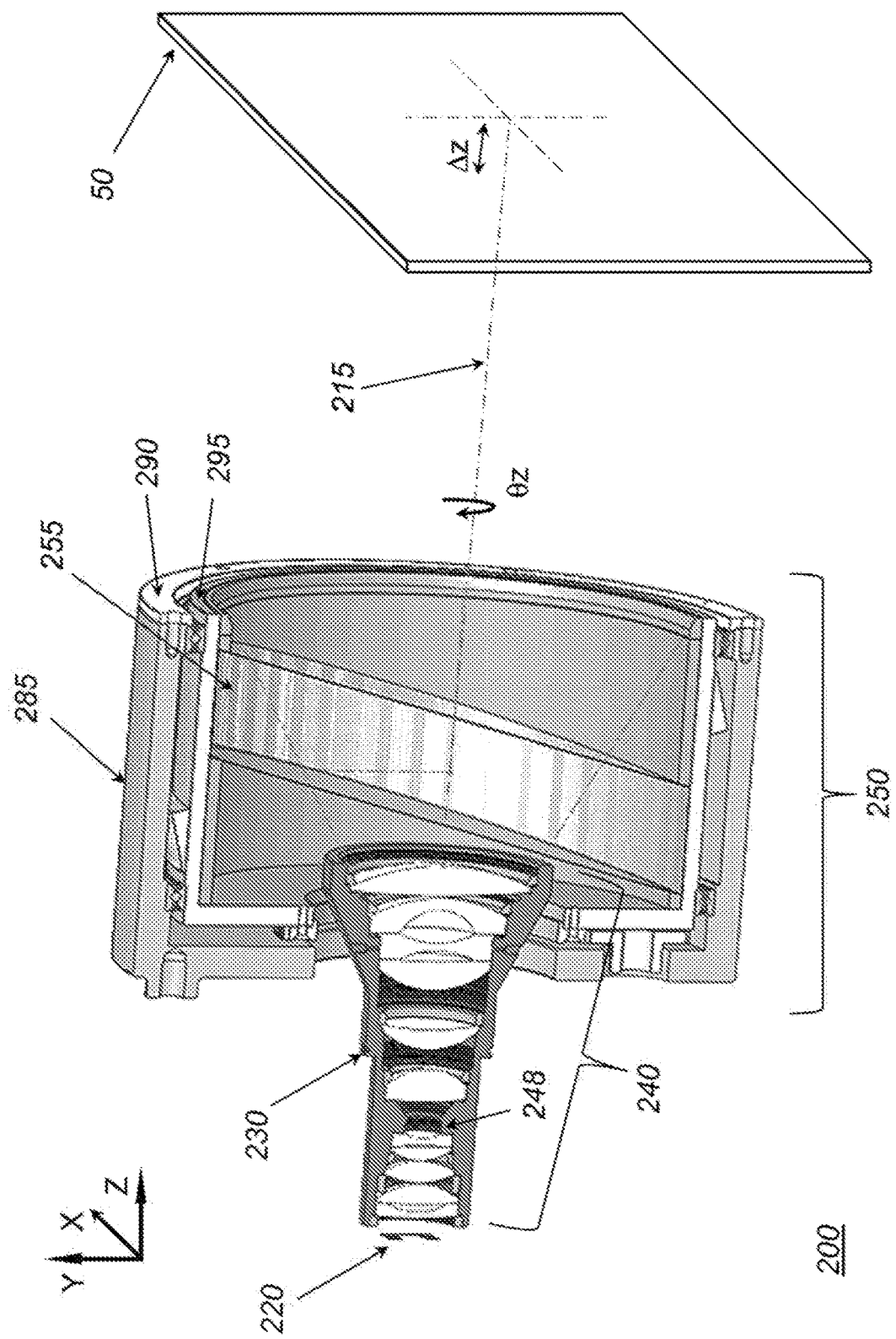
FIG. 8 depicts a perspective view of a projector subsystem including an example of a refractive speckle reduction assembly according to one example.

FIG. 8 depicts a side, cross-sectional view of the projection subsystem 200 that includes a projection lens 240 with respect to an object plane 220, and a deflector subsystem as the refractive speckle reduction assembly 250. The refractive speckle reduction assembly 250 in FIG. 8 has an optical element as a tilted optical plate 255 mounted within an actuator, such as a motor mechanism 285 that can rotate the tiled optical plate 255 in a direction $\theta_z$ about a mechanical axis 215. The motor mechanism 285 can have a fixed outer housing 290 that provides structural support and an inner housing 295 that rotates and holds the tilted optical plate 255. This example of a motor mechanism 285 can include both bearings and a directly mounted drive motor (not shown). For example, an Applimotion (Loomis, Calif.) direct-drive, frameless motor, such as a UTH series high output motor, such the UTH-355-A-83-A-x-000 motor, which has an 8.0 inch inner rotor diameter, can be used for this purpose, while either deep groove or angular contact bearings can be used. The air gap where the motor mechanism 285 surrounds the projection lens 240 (with an aperture stop 248) and the lens barrel 230 can be sealed to limit entry by dust or other contaminants. However, the motor mechanism 285 may not be mechanically coupled directly to the lens barrel 230 to reduce transmission of mechanical oscillation or vibration from the motor mechanism to the lens barrel, so as to limit image motion at the display surface 50. The motor mechanism 285 can rotate the tilted optical plate 255 through its revolutions at a constant θz rotational rate that is fast enough to avoid human perception of the rotational motion on the display surface 50. As an example, an operating rotational rate or motor velocity may exceed 40-60 Hz, or 2400-3600 rpm, which are frequency ranges above which the human perception of flicker falls off, although lower rotational velocities can be acceptable. The outer housing 290 and inner housing 295 can be oversized relative to the projection lens 240 such that the projection lens 240 can be offset in its orientation to the refractive speckle reduction assembly 250. The mechanical axis 215 of rotation of the tilted optical plate 255 can either be offset from and parallel to, or co-linear with, an optical axis of the projection lens 240. Other motor mechanisms can be used, including those with only one housing, instead of an inner housing and an outer housing. For example, a small high rotation rate motor can be mounted directly against the inner housing 295, with two opposing bearing assemblies positioned 120° around the housing diameter. Alternatively, the tilted optical plate 255 can be mounted in a housing and rotationally driven by gears or a belt drive, either of which can be an inexpensive solution. A speed reduction can also be used between the motor and tilted optical plate 255 so that rotational rates of the motor and tilted optical plate 255 need not be identical.

Figure 9:
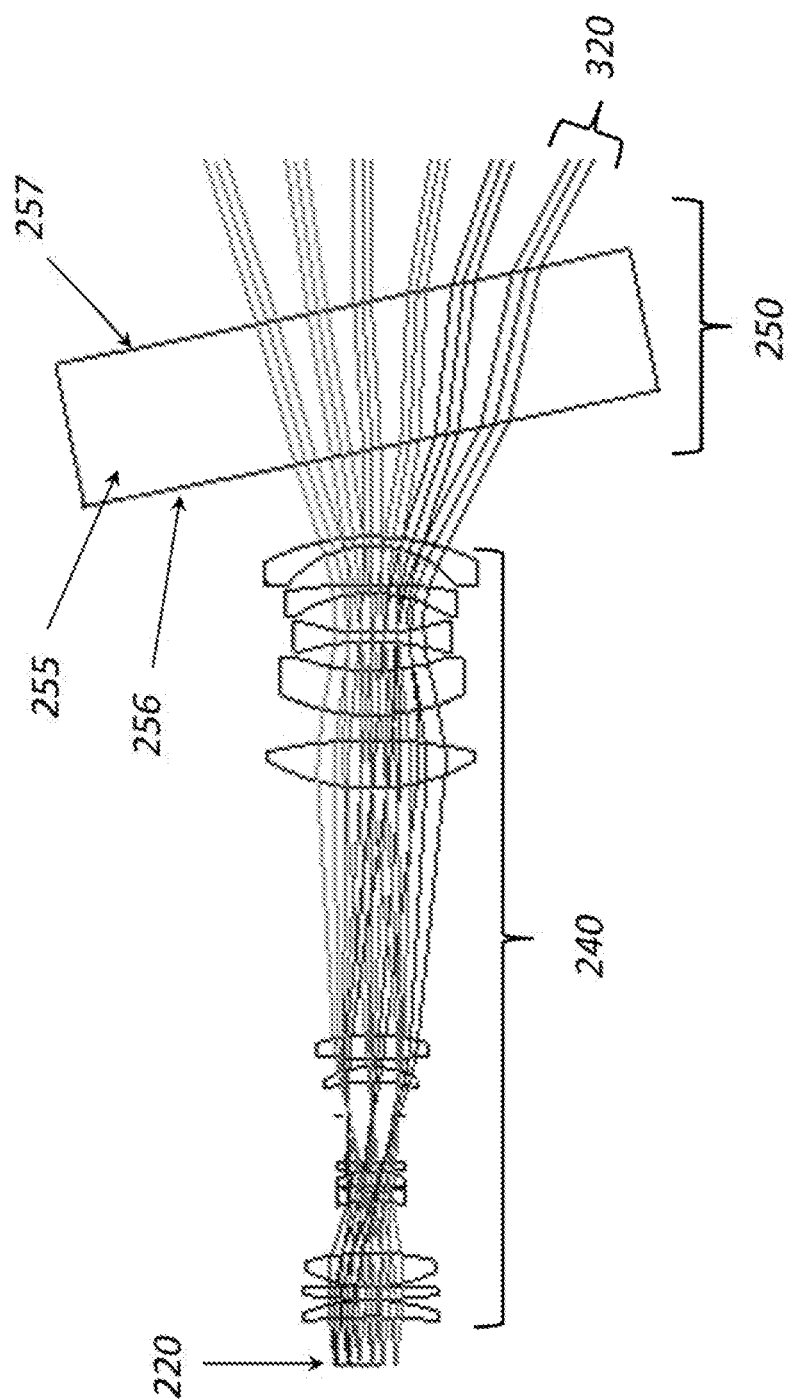
FIG. 9 schematically depicts an example of a meniscus-type refractive speckle reduction assembly according to one example.

The tilted optical plate 255 can be fabricated with side surface(s) parallel to the optical axis of the projection lens 240, the rotational axis of the tilted optical plate 255, or to the surface of the inner housing 295, which can reduce the part count for the refractive speckle reduction assembly 250. Alternatively, the tilted optical plate 255 can be fabricated with side surface(s) cut perpendicular to the inner surface 256 (or outer surface 257), as shown in FIG. 9. In this latter example, a sleeve (not shown), having an inner angled pocket to hold the tilted optical plates 255 of the refractive speckle reduction assembly 250, can be mounted within an inner housing.

The tilted optical plate 255 of the refractive speckle reduction assembly 250 can have a wedged surface. For example, the tilted optical plate 255 can be one or two plates having two non-parallel optical surfaces (inner surface 256 and outer surface 257) that are shaped with wedge, curvature, or the combination thereof. At any given rotational position of the tilted optical plate 255, the tilted optical plate 255 deflects the image light beams or convergent cones 320 emergent from the projection lens 240 (positioned with respect to the object plane 220) to be travelling on an optical path parallel to an original optical path to the display surface.

Figure 10:
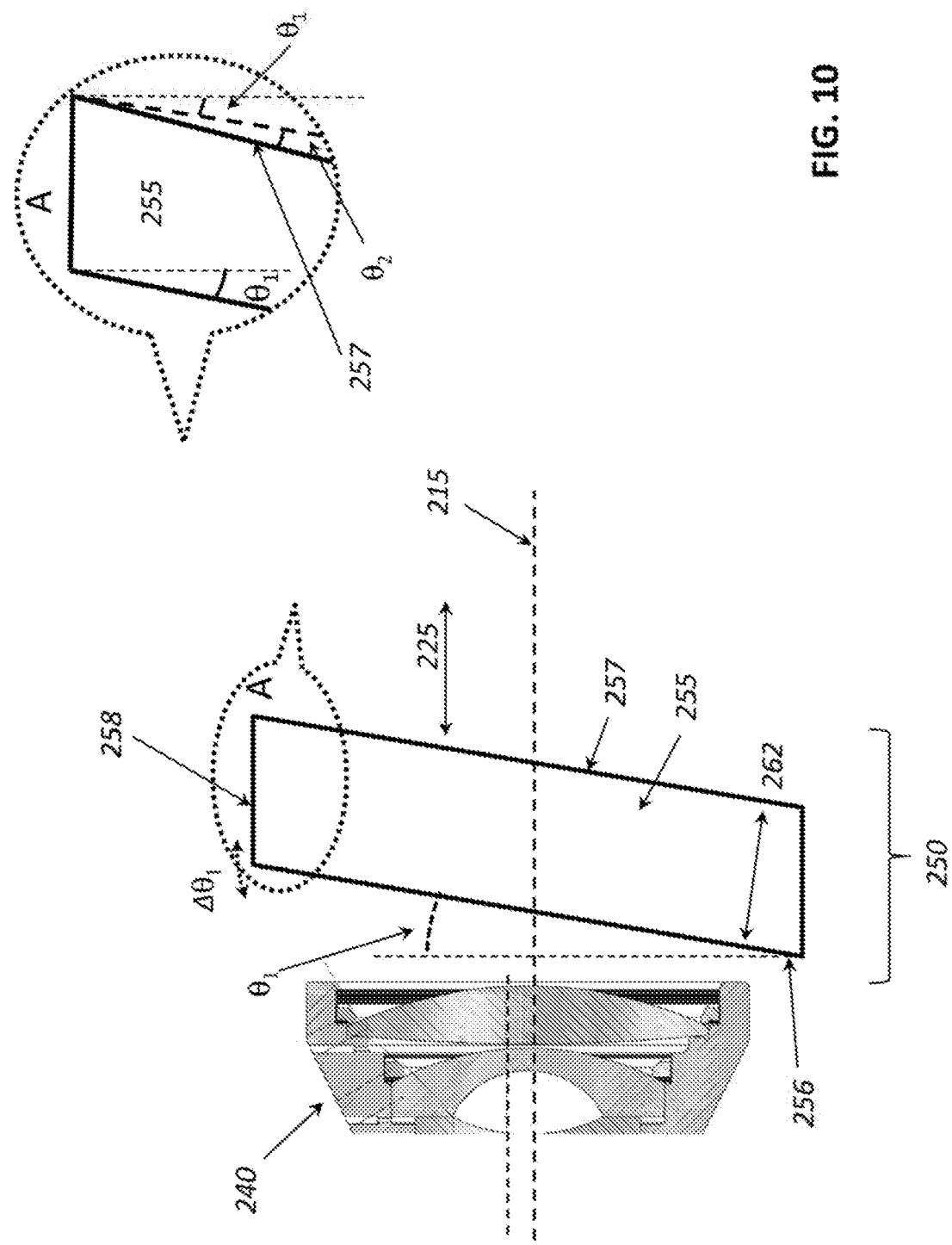
FIG. 10 schematically depicts a projection lens and a tilted optical plate for a refractive speckle reduction assembly according to one example.

A tilted optical plate with non-parallel optical surfaces can reduce image dither, which may be an average deviation of the light beams from the associated location. For example and as shown in FIG. 10, a refractive speckle reduction assembly 250 is located in image space 225. The tilted optical plate 255 can rotate about axis 215 that is parallel with the optical axis of the projection lens 240. A tilt angle $\varphi_1$ is between the inner surface 256 of the tilted optical plate 255 and a line perpendicular (i.e., normal) to the optical plate rotational axis 215. The angle between the outer surface 257 of the tilted optical plate 255 to a line perpendicular to the optical plate rotational axis 215 can be an angle that is the sum of the tilt angle $\varphi_1$ and a wedge angle $\varphi_2$ (see inset A). The wedge angle $\varphi_2$ represents the angular amount that the outer surface 257 is tilted further away from the line perpendicular to the axis 215 than the tilt angle $\varphi_1$. The wedge angle $\varphi_2$ in this example is the difference in angle between the inner surface plane and the outer surface plane with respect to a line perpendicular to the rotational axis 215 and represents the angular amount the inner surface 256 is not parallel to the outer surface 257. The value of the wedge angle $\varphi_2$ can be selected to redirect or re-center the image light beams for the target throw distance D from projector to screen. As an example, a tilted optical plate 255 can have a tilt angle $\varphi_1$ of 17 degrees and a wedge angle $\varphi_2$ of 4 arc minutes. The two surfaces may be nearly parallel, but the non-parallelism can allow image dither to be controlled. Although FIG. 10 depicts the outer surface 257 as the wedged surface of the tilted optical plate 255, the inner surface 256 can alternately have a wedge angle $\varphi_2$ to correct directionality of the convergent cones towards the intended screen position. As the tilted optical plate 255 rotates, sweeping the ray bundles that form image light beams through different positions around the traced out pattern (e.g., an annulus) on the outer surface 257, the wedge travels with the surface, and provides an angular correction to the resulting convergent cones directed or aimed towards the target surface (e.g., display surface 50 in FIG. 8). The wedge angle $\varphi_2$, modifying the tilt angle $\varphi_1$, can cause the convergent cones corresponding to a given image light beam to be deflected to focus towards a common location for the given image pixel on a display surface (e.g., image pixel 355 on display surface 50 in FIG. 7), instead of providing offset, at least partially overlapping, pixel images.

An effective rotational rate for a rotating tilted optical plate 255 can be any rate that results in images with reduced speckle. An example of a range of rates by which the tilted optical plate 255 can be rotated is 200 rpm to 3600 rpm or more. The tolerance in rotational rate may or may not be tight. For example, a 25 rpm variation between expected and actual rotational rate may not result in perceptible differences. Furthermore, the motor mechanism, as burdened with the tilted optical plate 255, outer housing, inner housing, and other components, can be balanced. Motor balancing can provide a stable prolonged operation of the motor mechanism, and help limit vibrations from coupling into the projector system, than by optical requirements. Mechanical isolation can also be used to limit vibration coupling to the projector. Motor imbalance, which can be limited, can be impacted in part by the weight of the tilted optical plate, which can depend on the glass thickness and glass density. However, a small motor imbalance, or motor wobble, can be used to cause a wobble (e.g., wobble $\Delta\varphi_1$ in FIG. 10) of the tilted optical plate 255 that can temporally vary the tilt angle $\varphi_1$. For example, varying tilt angle by a wobble $\Delta\varphi_1$ can alter the scatterers on the display surface that are sampled, potentially increasing spatial diversity and aiding speckle reduction, although at the potential cost of increased image dither. These impacts can depend on the magnitude of such wobble $\Delta\varphi_1$, and how the wobble $\Delta\varphi_1$ is synchronized with the rotation. An example of an amount of wobble $\Delta\varphi_1$ can be ±0.05 degrees or ±3 arc minutes.

Figure 11:
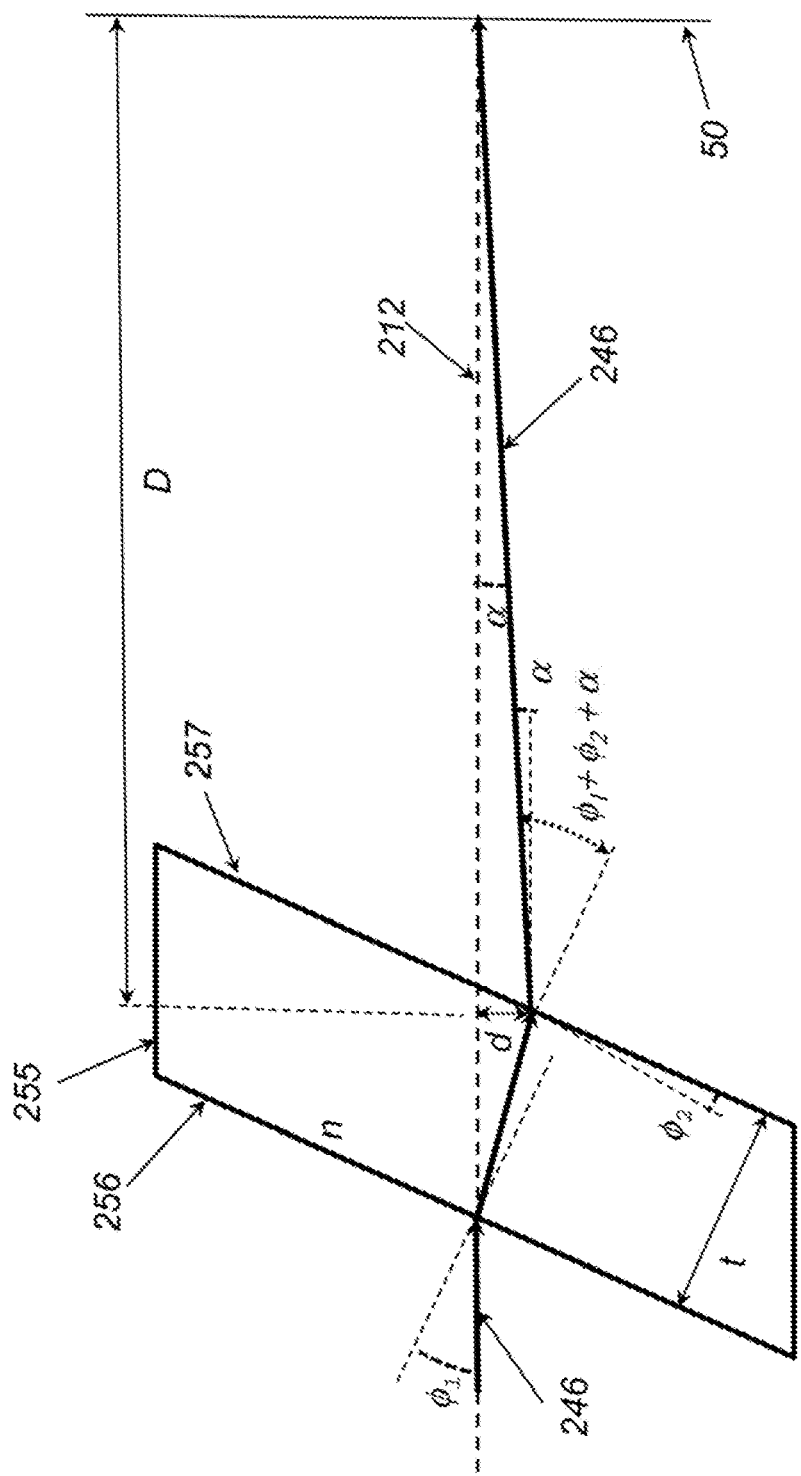
FIG. 11 is a diagram illustrating aspects of light beam propagation through an example of a tilted optical plate of a refractive speckle reduction assembly according to one example.

FIG. 11 schematically depicts an example of the geometry of a tilted optical plate 255 and aspects of the light propagation therethrough. A light beam 246 or a light ray is incident to the inner surface 256, refracts into the tilted optical plate 255 of thickness t and refractive index n, propagates to outer surface 257, and refracts towards display surface 50. The refraction of a light ray initially propagating along, or parallel to an optical axis 212 (which may be along or parallel to a mechanical axis), can be used to determine a displacement d, given a thickness t, index n, and a tilt angle $\varphi_1$, per equation (4):

$$d = t\sin\varphi_1 \left[ 1 - \left( \frac{1 - \sin^2\varphi_1}{n - \sin^2\varphi_1} \right)^{1/2} \right] \quad (4)$$

The tilt angle $\varphi_1$ shown in FIG. 11 is the angle between the axis of the rotation of the optical plate 255 and a line normal to the inner surface 256 that is the same angle between the inner surface plane and a line normal to the rotational axis. To reduce or eliminate image dither, wedge is shown at the outer surface 257 of the tilted optical plate 255, as described by the wedge angle $\varphi_2$. In FIG. 11, α is the angle to redirect the light back to the original point on a plane (the display surface 50), which is displaced from the tilted optical plate 255 by a distance D (the throw or throw distance). The angle of the redirected light with respect to a line normal to the outer surface with a wedge angle $\varphi_2$ is the sum of the tilt angle $\varphi_1$ the wedge angle $\varphi_2$ and the redirect angle α. Given knowledge of a throw distance D and the displacement d, the redirection angle α is d/D by the small angle approximation. An initial wedge angle $\varphi_2$ for tilted optical plate 255 can then be calculated per equation (5):

$$\varphi_2 = \frac{\alpha(1-\sin^2\varphi_1)^{1/2}}{(n^2-\sin^2\varphi_1)^{1/2}-(1-\sin^2\varphi_1)^{1/2}} \quad (5)$$

Accordingly, per FIG. 11 and equations 4 and 5, if a light beam 246 is incident to the inner surface 256, and deflected by the tilted optical plate 255, it emerges from the outer surface 257, according to the combination of refractive index, optical thickness, wedge angle, and tilt angle, such that the emergent light beam is directed at the same location on a distant plane at a given distance from the optical device. As the tilted optical plate 255 is rotated over time, image light is precessed through an angular volume (e.g., as shown in FIG. 7) and a larger time averaged numerical aperture or smaller F# is produced, directed at a substantially fixed location in space (the screen, at a distance D from the tilted optical plate 255). Image dither can be an optical path length difference of image light to the plane or display surface 50, varying versus field of view, as the image light traverses the tilted optical plate and across the display surface, where image dither can be distances traversed in a plane of the display surface.

A tilted optical plate 255, as in FIG. 10 for example, can be fabricated with a specified glass, thickness 262, diameter, cut of the side surface 258, and wedge angle $\varphi_2$. Appropriate specifications for surface flatness, scratch-dig, glass homogeneity, and anti-reflection (AR) coating performance can also be determined and applied. Once a tilted optical plate 255 is fabricated, it can be aligned within the inner housing 295 of FIG. 8. If, for example, the tilt of the tilted optical plate 255, with respect to the mechanical axis 215 in parallel with the optical axis of the projection lens 240, is around the x-axis, then the wedge angle $\varphi_2$ (the non-parallelism, or difference from parallelism, between the front and back surfaces) may be rotated around the same axis. Errors in either setting the tilt angle or fabricating the wedge can be compensated by the other. For example, if the wedge angle $\varphi_2$ of the plate is fabricated with a modest magnitude error, then the tilt angle $\varphi_1$ can be adjusted to control image dither. Likewise, within limits, changes in the throw distance can also be tuned or compensated for by changing the tilt angle $\varphi_1$ of the tilted optical plate 255.

A refractive speckle reduction assembly 250 with the tilted optical plate 255 can be positioned external to the projection lens 240, in image space 225 on the screen side (e.g., FIGS. 5, 8). In one aspect, the tilted optical plate 255 can be located in a collimated space, instead of convergent or divergent beam space, to reduce the impact of optical aberrations such as astigmatism. In other examples, the tilted optical plate 255 can be inserted within the projection lens 240, such as at or near the aperture stop 248 or in the optical space between one or more groups of projection lens elements, such as between lens elements 244b and lens elements 244c in FIG. 5. If the tilted optical plate 255 is placed internal to the projection lens 240, its size (diameter and thickness) can be smaller, as compared to the location external to the projection lens 240. In such circumstances, the downstream (screen side) projection lens elements 242 can increase in size to support a larger effective numerical aperture. Additionally, spaces within the lens, whether at or near the aperture stop 248 or in another optical space, such as the space between lens elements 244b and lens elements 244c, may not sufficiently approximate collimated space, relative to considering the image light beams 246 from a given field point or pixel at the DMD or screen. In particular, within the projection lens 240, such field point image light beams 246 may depart significantly from collimation, and off axis optical aberrations, such as astigmatism and coma that occur when imaging through a tilted optical plate can then become significant and further reduce image quality.

On the other hand, A refractive speckle reduction assembly 250 that can be external to the projection lens 240, in image space 225, need not cause significant optical aberrations (e.g., astigmatism and coma) when image light propagates through a tilted optical plate. In particular, the individual image light beams 246 can be convergent cones that can converge at a relatively slow rate (e.g., F/400-F/7000, depending on the throw distance or magnification) to a local area (e.g., the area occupied by one to a few pixels) on the screen that the light beams 246 can approximate a collimated beam on an individual basis during transit of the tilted optical plate 255. This near or nominal collimation of individual image light beams 246 can occur even though the projection lens 240 is a wide angle lens, from which the emergent image light beams 246 in image space 225, in aggregate, can be highly divergent to illuminate a large screen. As a results, a faster effective F# ($F_2$) to the screen can be achieved. However, as that faster F# is created after the projection lens 240, rather than prior to or within the projection lens, the speed of the projection lens 240 can be reduced, which in turn can reduce the size and cost of the projection lens elements 242, and improve image quality.

Figure 20:
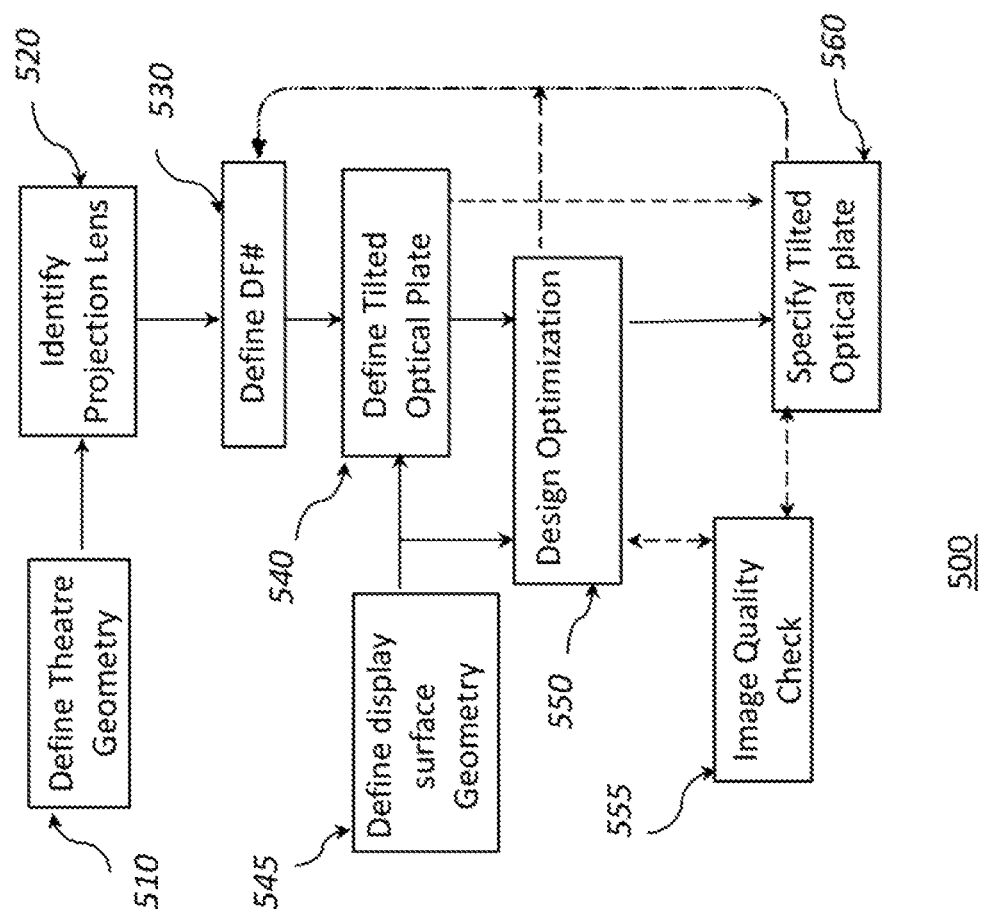
FIG. 20 depicts an example of a process for designing a refractive speckle reduction assembly according to one example.

FIG. 20 is a flow chart a process 500 for providing or designing a tilted optical plate for a deflector subsystem application in a particular theater according to one example. In block 510, the theater geometry, including the throw distance and throw ratio of a theater, is defined. Typically, the screen throw distance is longer than the screen width. However, in wide screen theaters, the screen width can be larger than the throw distance. Also, as the size of the object (e.g., a DMD or the intermediate image) is known, the projection lens can be identified in block 520, along with the nominal lateral magnification (m) and field of view to the screen (for example, for imaging a DMD to a 40 ft. screen, m≈400×). The projection lens can be identified or defined using an actual optical prescription, or alternately using first order properties or output ray trace data for modeling the lens as an input.

In block 530, a desired increase in angular diversity, as a change in F# (i.e., ΔF#) or numerical aperture (i.e., ΔNA) from a refractive speckle reduction assembly is defined relative to a faster effective F# to the screen ($F_2$) from creating a composite beam of a convergent cone. In block 540, the tilted optical plate can be defined translating and using the effective F# to the screen as parameters that can initially define the tilted optical plate. For example, equations 4 and 5, which together depend on the light beam displacement or excursion caused by the plate, the plate thickness (perpendicular to the surface), the refractive index n(λ), and the tilt angle can be used to define the tilted optical plate. The refractive index can be defined by glass selection preferences, and selection of the plate thickness and tilt angle can depend on mechanical preferences relative to the mass and the balancing thereof when in motion. During subsequent design optimization per step 550, the plate design can deviate from initial parameters defined using equations 4 and 5, including to determine an alternate wedge angle or to add curvature to the surfaces. As a result of this potentially iterative design approach, the effective F# to the screen can be decreased. This change may not be large, but it can be equivalent to changing the F# collected by the projection lens from the object plane more significantly, using a system that is easy to design and fabricate to specify the tilted optical plate in block 560.

Figure 12:
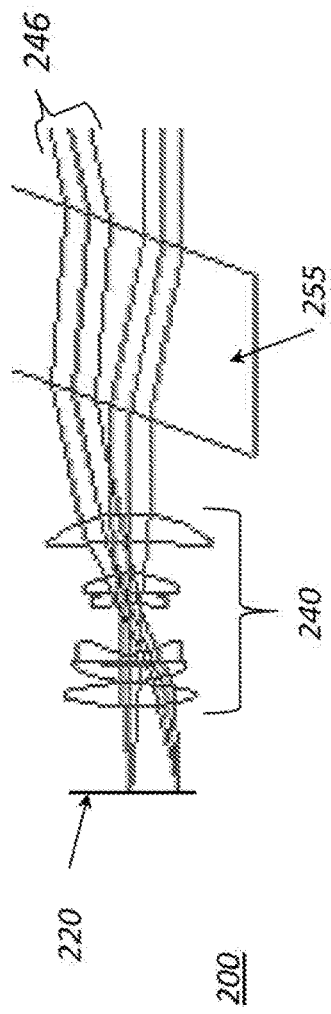
FIG. 12 depicts a cross-sectional view of a projection lens in combination with a tilted optical plate of a refractive speckle reduction assembly according to one example.

The design of a tilted optical plate per the process 500 of FIG. 20 can involve defining an offset of the image light beams that can provide the desired effective f-number (F#$_2$) from the composite beam to the display surface for increased angular diversity. The offset or displacement of the image light beams can be determined by the refractive index, thickness, and tilt angle of the glass. The choice of wedge angle can determine how well the image light beams are directed back to the original nominal screen locations. The first order properties or parameters of the refractive speckle reduction assembly can also be defined (in block 540) using the throw, field of view (FOV), and gain in effective F# as input. For example, FIG. 12 depicts a projection subsystem 200 with a projection lens 240 with respect to an object plan 220 and having a focal length that can project to a half-field angle, in combination with a tilted optical plate 255 for deflecting light as light beams 246. The projection lens may support a theater having a long throw. Use of the tilted optical plate 255 can convert the f-number to the screen to a lower f-number for a composite beam, or have the projection subsystem 200 appear to operate at a certain f-number to the object plane 220 for speckle reduction purposes, even though the projection lens 240 operates at a different f-number to the object plane 220 for imaging purposes.

Figure 13:
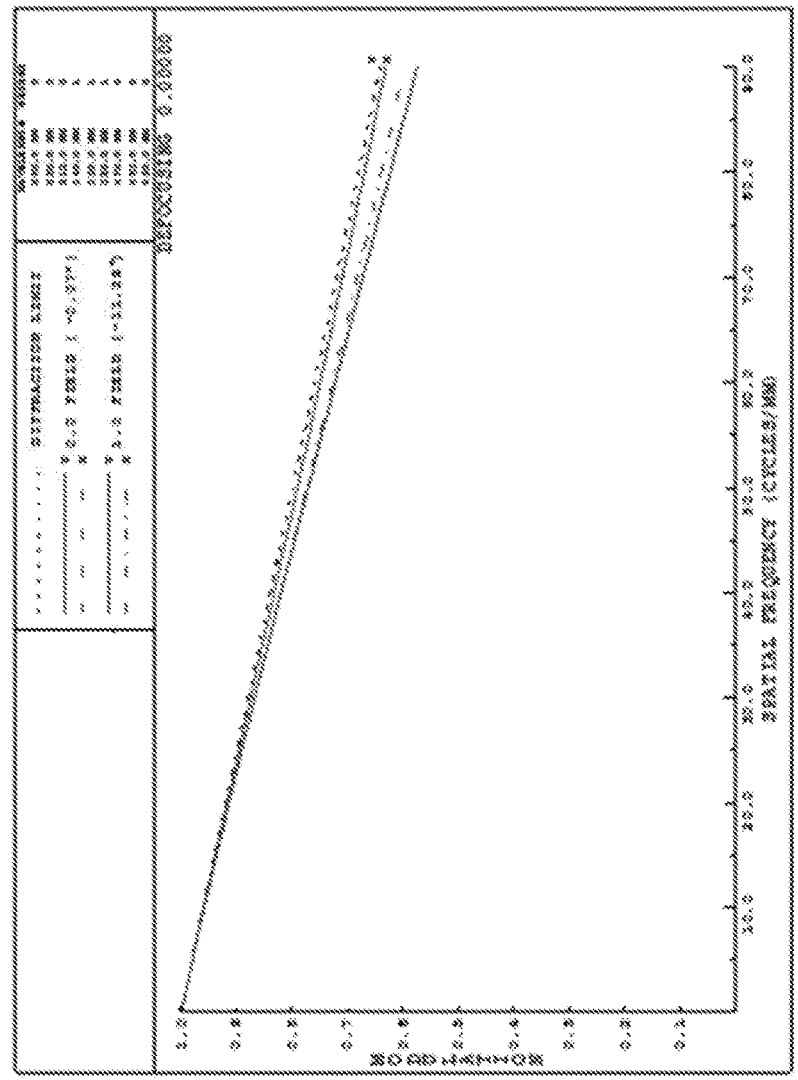
FIG. 13 is a graph illustrating image quality performance of an example of a projection lens, as measured by the MTF thereof, according to one example.

Image quality can be checked in block 555. For example, optical design software can optionally be used to analyze the imaging of the tilted optical plate as it is rotated about the optical axis to assess the impact on image quality. The instantaneous MTF image quality provided by the image light beam transiting the tilted optical plate at any given rotational orientation of the tilted optical plate may be substantially unchanged from the performance of the subsystem 200 in FIG. 12, shown in FIG. 13, since the image light beams are nearly or nominally collimated or very slowly convergent towards the screen, and tilted plate aberrations such as astigmatism can be minimal (e.g., ≤λ/20). Likewise, comparative optical analysis of imaging with and without the tilted optical plate(s) 255 reveals that lateral color can be dominated by the lens performances, with little increase thereof due to the addition of the tilted optical plate(s) 255.

Image quality can also depend on whether a refractive speckle reduction assembly with a tilted optical plate rotated by a motor mechanism causes significant image dither or not. Considering again FIG. 7, a plane, parallel to this local area of the display surface 50 and located a distance away in the "Z" axis direction back towards the projector, the centroids of the convergent cones 320 trace out a circular pattern. If the display surface 50 is positioned in an offset location from the best focus location to where the convergent cones 320 are aimed to converge to a point, then the rotational motion of the refractive speckle reduction assembly 250 can cause the convergent cones 320 to rotate through spatial locations on the display surface 50 that create image motion or dither (e.g., a Δx and Δy variation in image position at the display surface 50). The image dither can be an undesirable residual beam-steering effect where motion of the tilted optical plate causes the image light beams to deviate on the target surface away from the locations that to which the light beams would have been directed without use of the tilted optical plate. The resulting spatial displacement or positional deviation can reduce image resolution (MTF). However, a deflector subsystem, such as one with a tilted optical plate can be designed to reduce or eliminate this beam-steering effect and reduce the resulting motion to a residual image dither to levels—measurable in fractions of a pixel width—that is intended to be not visually perceived by viewers. The projected image can be created using area projection of the spatial light modulators (see FIG. 5) rather than by scanned projection, and image dither from the despeckling device may cause only a small resolution loss to the projected image pixels, whose impact can deliberately reduced to retain image quality.

In particular, the residual image dither can have characteristic magnitudes and shapes that trace out local positions (Δx and Δy) versus time relative to a given image pixel, the maximum magnitude of which can be designed to be less than one-half pixel width. Typically, image light directed along the optical axis through a tilted optical plate(s), and directed to center screen, has a circular image dither profile. The instantaneous focus position of the projected image light to the center screen pixel traverses the image dither circle twice for one revolution of the tilted optical plate(s). Generalizing, the image dither curves enclose an excursion area, and the outer boundary of the excursion area defines an image dither area traversed on the display or target surface at a given field point. With increasing field position, the image dither curve patterns experienced by off-axis projected image light generally become increasingly asymmetrical. Additionally, with increasing field position, the image dither curve patterns tend to overlap with themselves, so that the image focus position also transits within the excursion area. For example, many of these image dither curves can be described as specific types of roulettes, such as circles, ellipses, limacons and rhodoneas. Notably, the image dither curve patterns at a given pixel location to vary little in shape or magnitude with color or wavelength, but lateral color can cause these curve patterns to be spatially offset from each other. The fact that these image dither patterns are continuous and predictable, and can be characterized as mathematically described curves such as roulettes, even when they are highly asymmetrical in shape, means that image dither deterministically remains within known ranges during operation of the refractive speckle reduction assembly. Image dither can then be defined with tolerances, including a maximum tolerance for all field points, or as a series of maximum tolerances defined for different field points with the projected field of view.

This residual image dither can have characteristic magnitudes and shapes that can be both modeled and optimized in block 550 of FIG. 20. In particular, image dither curves at different field positions, or the maxima or averages thereof, can be calculated at different field positions. Then for example, during design optimization, off-axis performance (reduced image dither) can be improved, while increasing image dither magnitudes closer to screen center. Also, during optimization, pixel width fractions can equivalently be calculated as display pixels (at the spatial light modulator or intermediate image) or as image pixels or screen pixels (at the display surface). Additionally, given the various complex image dither curve patterns that can occur, using a maximum image dither as a benchmark during design can overstate the effective image dither that occurs. Thus, benchmarking or optimizing image dither with a magnitude of a time averaged image dither can be more appropriate.

Whether the image dither traverse a circular pattern, or a more complex pattern, the image dither can generally complete two revolutions for one revolution of a tilted optical plate, which can improve the temporal averaging of speckle. In general, depending in part on the screen structure and scatterers, residual image dither can help speckle reduction by varying the spatial coherence of the image light by increasing the effective spatial diversity of the image light/scatterer interactions over distances ($\Delta x$, $\Delta y$) or spatial positions on the display surface. As another point, even though image light is transiting the tilted optical plate with different optical path lengths depending on field, use of the refractive speckle reduction assembly may not introduce significant additional aberrations, including lateral color error.

Figure 14:
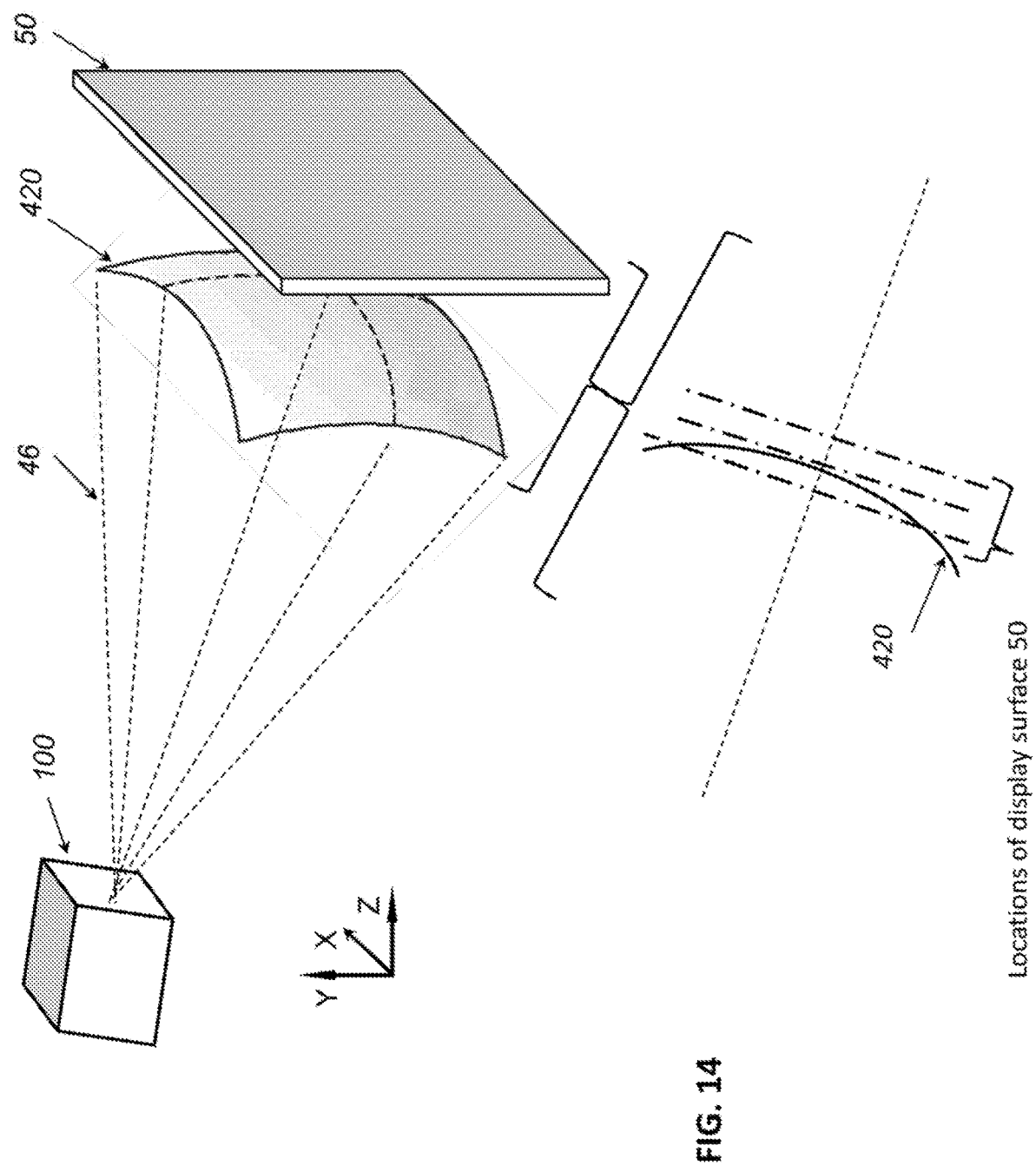
FIG. 14 depicts the projection with a surface of least dither as provided by a refractive speckle reduction assembly according to one example.

Another factor in limiting image dither is to account for its three-dimensional nature. FIG. 14 schematically depicts expanding projected light 46, provided by a projector system 100 equipped with a refractive speckle reduction assembly, that creates an arced surface profile of least dither 420. If the center of the surface profile of least dither 420 intersects with display surface 50 at the screen center, then the least dither can occur at screen center, and dither will progressively increase away from screen center. For example, in such circumstances, the residual image dither at screen center can be controlled to ≤1/100 of a projected pixel width.

Initial parameters of the tilted optical plate, including tilt, thickness, refractive index, and screen throw can be defined in block 540 of FIG. 20, using, for example, equations 4 and 5 to determine an initial wedge angle. These parameters can be adjusted during design in block 550 to adjust the position of the surface profile of least dither 420 in FIG. 14 relative to the display surface 50 to provide a weighted average of reduced dither over the field of view. Equation 5 can provide a wedge angle that corresponds to zero image dither at the center of the screen for the prescribed throw distance. As optimization occurs relative to providing a weighted-average, reduced image dither over the field of view (for example, favoring the central 50% screen area), or relative to positioning a surface profile of least dither 420 to the display surface 50, an optimized wedge angle deviates from the initial nominal wedge angle provided from equation 5. In greater detail, as shown in the inset of FIG. 14, the surface profile of least dither 420 can fall before the screen, just intersect the screen at a point, be pushed past the screen, or be located in an intermediate position that partially intersects with the screen. For example, the surface profile of least dither 420 can bisect the display surface 50 such that least dither occurs in circular area with greater dither near screen center and screen edge. With such an approach, residual image dither can be generally balanced across screen, although image dither at screen center can be controlled to lower levels than at screen edge. On the one hand, as image content typically directs viewer attention towards screen center on an ongoing basis, having less resolution loss from residual image dither at or near screen center can be valuable. On the other hand, as image dither contributes spatial diversity and thus speckle reduction, residual dither proximate to screen center can be valuable. Therefore, a design approach where residual image dither is unevenly balanced or unevenly averaged across the projected FOV can be used, where screen center dither is at finite levels (e.g., ≤1/10$^{th}$ pixel width) instead of negligible levels (e.g., ≤1/50$^{th}$ pixel width). The maximum dither anywhere else on the screen, such as edges of the screen, can be a projected image pixel width or less.

Other aspects of theater geometry can affect performance. As shown in FIG. 4, the projector system 100 can project downwards over the audience, as enabled by having the projection lens project an offset image, or by tilting the projector, or the combination thereof. As shown in FIG. 14, the surface profile of least dither 420 can be positioned asymmetrically to the screen, and can be further from the screen at the bottom than at the top, resulting in greater residual image dither at the bottom of the screen than at the top. Tilt of the display surface 50 can improve or worsen the alignment of the screen to this surface profile of least dither 420, changing the effective dither present across the screen surface. The screen can be tilted with the bottom edge closer to, or further from, the audience. Alternately, or additionally, theater screens can be curved towards the audience (see, e.g., FIG. 4), such as in a cylindrical or spherical manner. While such screen-curvature can aid image quality, relative to controlling both resolution and distortion across the screen, for projector systems equipped with a refractive speckle reduction assembly, the curved screen surface may curve towards the surface profile of least dither 420. Optimizing the design of the tilted optical plate 255, per block 550, to reduce image dither can account for the display surface geometry, including the downward tilt of the image light 46, and the tilt and curvature of the screen, as design factors. In general, the designs and associated magnitudes of residual image dither can be calculated on a display surface or plane of best image focus as provided by the projection lens, where then the surface profile of least dither 420 intersects with the display surface 50. In some instances or venues, it may be feasible to optimize residual image dither by moving projector position with respect to the screen, or alternately adjusting the screen with respect to the projector position.

FIGS. 15 and 16 depict part of an imaging system that includes a tilted optical plate 255 of a refractive speckle reduction assembly 250. The tilted optical plate 255 includes two tunable wedge optical plates 280a, 280b positioned with respect to a projection lens 240. The plates 280a, 280b can each have a fraction of the specified wedge to minimize image dither and can have interior optical surfaces separated by a small air gap 282 that can be maintained by shims or tape. Alternatively, this small air gap 282 (e.g., 100 microns thick) can be filled with a viscous optical index matching fluid. The width of this gap 282 can also be increased to modify the displacement provided by the dual wedged plate assembly.

The two plates 280a, 280b can be fabricated to have the same type of glass, glass thickness, tilt $\varphi_1$, and half the target wedge ($\varphi_2/2$). Measuring the angle and magnitude of the wedge in the plates 280a, 280b can be accomplished using an autocollimator. Once fabricated, the two plates 280a, 280b can be rotationally aligned (see FIG. 16) to each other to controllably provide a given aggregate wedge angle $\varphi_2$ within a range of potential wedge values. This can involve tuning the wedge to a throw distance for an installed projector by rotating one of the plates 280a, 280b with respect to the other around its local z-axis or local optical axis. The $\theta_z$ rotation range can span the range of 0-120 degrees, for example.

The two tunable wedge optical plates 280a, 280b can then be fixed in a rotational position to each other and mounted together as a unit within a sleeve of an inner housing. If the tilt of the tilted optical plate 255 occurs around the X-axis, the vectorial sum of the two wedges can be rotated to be about the X-axis to produce a net total wedge angle $\varphi_2$). Changes in the magnitude of the vectorial sum of the plate wedges can be made by rotating the plates 280a, 280b with respect to each other (see FIG. 16) and about an axis 215 (see FIG. 15) as long as the resultant sum remains rotated about the X-axis. For example, if each plate has an equal amount of wedge, making adjustments to the total wedge of the tilted optical plate 255 can include a clockwise rotation of one plate with an equal counter-clockwise rotation of the other. This adjustability can enable tunable correction for variations in screen distances as well as compensating for manufacturing error in wedge and tilt.

The tilted optical plate 255, including the two tunable wedge optical plates 280a, 280b, can then be rotated by the motor mechanism of the refractive speckle reduction assembly 250. Thus, this dual-wedged plate can provide essentially the same speckle reduction and image dither control performance as a single wedged plate solution, but with greater flexibility. For example, the effective wedge angle can be tuned for a range of theaters, reducing the logistics and costs.

Although the tilted optical plate 255 of FIG. 16 is depicted with two plates 280a, 280b, in other example, more than two plates can be used. In either case, an appropriate amount of wedge can be supplied to the plates to reduce the beam-steering motion effect that the tilted plates may otherwise cause to the image light.

Figure 17:
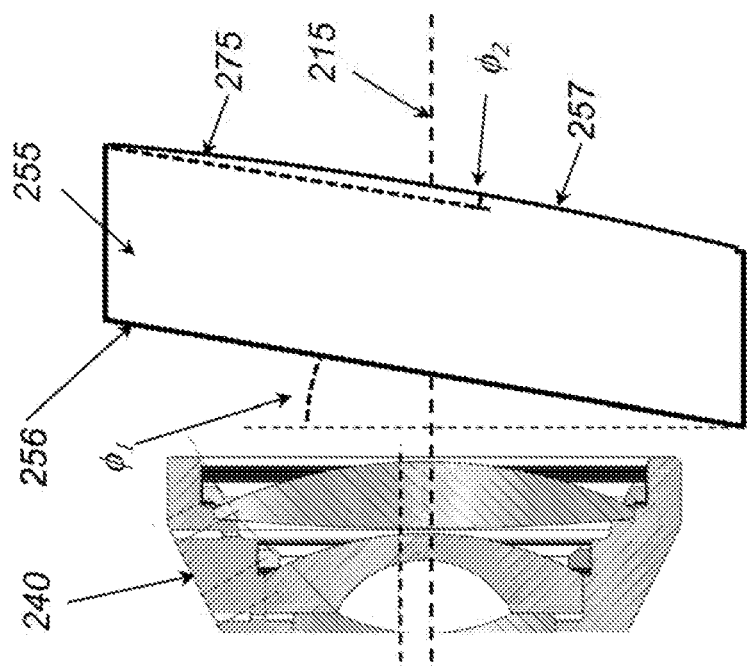

In some examples, a single-curvature, wedged plate can be used for the tilted optical plate. FIG. 17 depicts an example of a tilted optical plate 255 having a curvature 275 (exaggerated for visibility) of an outer surface 257 both wedged and curved. The tilted optical plate 255 with the curvature 275 can rotate about the axis 215. Providing a curvature 275 that has a large radius (e.g., 5 meters to 50 meters) can introduce a small amount of optical power to the tilted optical plate 255 and that can have negligible impact on the image forming characteristics of the projection lens 240. However, this type of surface curvature can provide a variable wedge versus FOV and can improve aiming of the deflected convergent cones towards the screen, enabling the image dither to be further reduced, and particularly to be better optimized across the screen.

Figure 18:
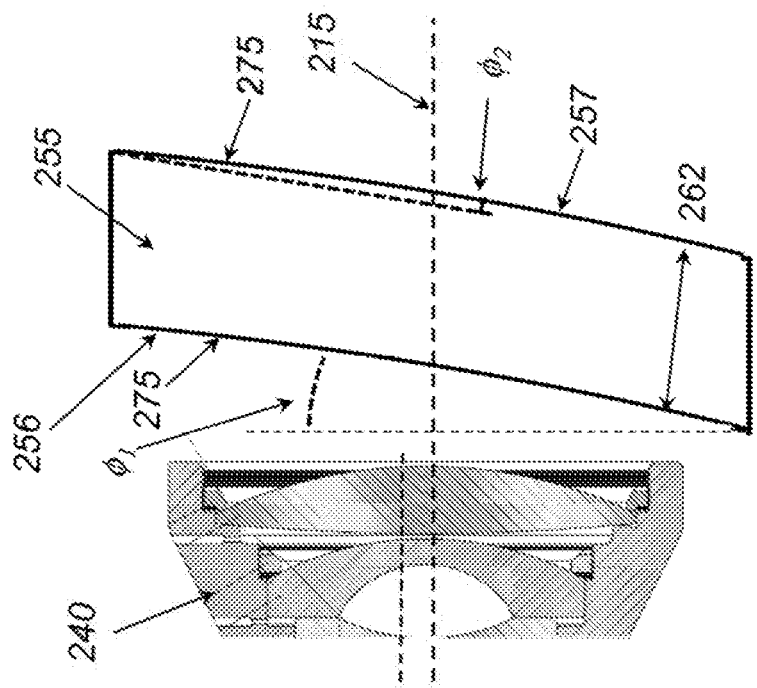
FIG. 17 and FIG. 18 each depict an alternate example to that of FIG. 16 for a tilted optical plate of a refractive speckle reduction assembly according to some examples.

In some examples, the tilted optical plate 255 of FIG. 17 can be a meniscus-type lens, with curvatures 275 on both the inner surface 256 and outer surface 257, but with or without an additional wedge angle $\varphi_2$. FIG. 18 shows one such example with a tilted optical plate 255 positioned with respect to a projection lens 240 and rotatable about an axis 215. Each of the inner surface 256 and the outer surface 257 has a curvature 275 and a specified width 262. This can provide greater control of image dither over the projected FOV by providing a variable wedge versus FOV on both surfaces. The meniscus-type lens can also be split into two or more plates in similar fashion to the alternate example of FIG. 15, with interior optical surfaces being planar or curved, and separated by a gap as appropriate. A meniscus-type tilted optical plate 255 can be used over a throw range of at least several feet. And a tunable version provides greater flexibility and lower costs.

Taken together, if a theater and screen are specified (e.g., in blocks 510 and 545 of FIG. 20), and a given projection lens model and FOV are known, then a refractive speckle reduction assembly can be defined to reduce speckle visibility and control image dither across the field. Speckle reduction can be determined by specifying (in block 530 of FIG. 20) a change in effective F# ($F_1 \rightarrow F_2$) or numerical aperture at the screen (or at the object plane), or determining the excursion of the imaging light created by the tilted optical plate, which in turn can be defined by the selection of glass or refractive index ($n(\lambda)$) of the tilted optical plate, as well the thickness, air gap, and tilt angle thereof. Specifying other variables for the tilted optical plate, e.g., a wedge angle, and a curvature of one or both surfaces, which in turn control the positioning and three-dimensional shape of the surface of least dither, can control the image dither. Other parameters or variables, which can be accounted for in optimization (e.g., in block 550 of FIG. 20) to control image dither or reduce speckle visibility, can also include screen tilt and curvature (as in block 545 of FIG. 20), positioning of a surface of least dither (which affects image dither), the motor rotation, the rotational velocity, or rpm (which can also affect speckle), and the tilted optical plate wobble (which can affect image dither and speckle). Retaining a small amount of image dither (e.g. 5-10%) can also help speckle reduction, as the incident light beams or convergent cones to an image pixel traverse an increased angular space to provide a composite beam and traverse a local time variant collection of scatterers on the screen surface, thereby increasing both angular and spatial diversity. An optional image quality check (e.g., in block 555 of FIG. 20) can also be included in the despeckling design process to examine the image quality loss (e.g., MTF) caused by a despeckling design.

The process 500 for providing or designing tilted optical plate(s) for use in a refractive speckle reduction assembly in a given theatre can be repeated to cover a variety of theatre configurations, including different throw ratios, throw distances, and screen shapes. For example, for shorter throws (e.g., <50 ft.), the meniscus-type tilted optical plates 255 of FIG. 18 can provide values of residual image dither that are under a maximum image dither target threshold of <½ pixel width, while the dual-plate designs (FIG. 15) have even larger values. Whereas, for screen throw distances in excess of 50 ft., the dual-plate design can provide maximum residual image dither values <½ pixel width, while the values from the meniscus type can be lower. Different types of tilted optical plates can be used for different theater configurations, which may depend on throw distance. For example, for theatres with throw distances less than 50-60 ft., meniscus-type devices can be used due to their performance in reducing image dither. Whereas, for theatres with throw distances greater than 50-60 ft., single or dual-plate type devices can be used due to their reduced cost.

A suite of prefabricated tilted optical plates can be provided to support different configurations (e.g., dual-plate or meniscus) for different theatre configurations. In the case that one or more suites of tilted optical plates 255 have been predesigned for mounting with a motor mechanism 285 to form a refractive speckle reduction assembly 250, then when a theater, screen, and lens are specified, a predesigned tilted optical plate 255 can be defined and specified without necessarily having to revisit the optimization process. Such logistics and cost problems can be improved by using a dual-plate-type tilted optical plates, such as that of FIG. 15 having two tunable wedge optical plates 280a and 280b. For example, only one or two dual plate designs may be needed to span the throw range, depending on the throw ratios, screen geometries (curvature or tilt), and specifications for residual image dither. A tilted optical plate 255 designed to work at a given throw range and given throw ratio, can also work (e.g., less image dither) for less extreme fields of view or larger throw ratios, although not optimally so. However, as throw ratios become more extreme, it can become harder to design tilted optical plates to reduce image dither below the target levels (e.g., less than one-half or 7/10th pixel width). As the pixel size also increases, the fractional increase in image dither is not as large. Thus, for example, a design of a wedged tilted optical plate for 0.74 throw ratio projection with a 70 ft. throw can still provide less than one-half pixel width maximum dither, even at the screen edges. With this despeckling device, image dither can be limited to less than or equal to one-third pixel width across the entire screen, but for the most extreme theaters (e.g., short throws less than 40 ft or small throw ratios T less than 0.80), larger values (e.g., one-half to three-fourths pixel width) may be tolerated, particularly near the screen edges. For example, a spatial displacement of a light beam deflected toward a display surface can have a maximum limit that is based on a wedge angle of the tilted optical plate, a curvature of a tilted optical plate, and an amount of wobble of the tilted optical plate in rotating about an optical axis. A tilted optical plate 255 can be selected for a given theatre configuration from a suite of tilted optical plates that include designs for a single-wedged plate, a dual-wedged plate, a single curvature wedged plate, and a meniscus plate.

Figure 19:
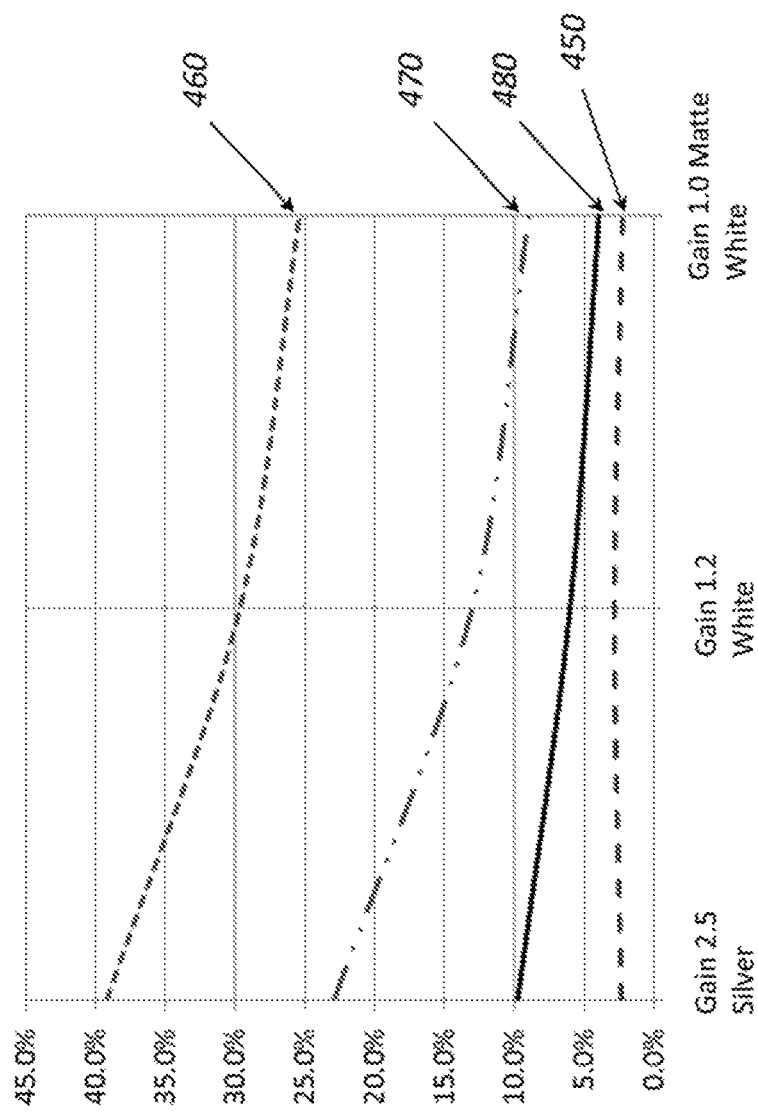
FIG. 19 is a chart of an example of speckle reduction provided by a refractive speckle reduction assembly according to one example.

A despeckling device can be used for controlling or reducing image dither by adjusting design attributes of the tilted optical plate 255 used in the refractive speckle reduction assembly 250. FIG. 19 shows the results of projection tests completed with a despeckling device with a rotating tilted plate according to one example. Measured speckle levels for different screens and light sources are shown, collected with a digital camera in front of the screen. In particular, as a benchmark, the incoherent source speckle 450 produced by an incoherent white light lamp source on three screens with different gains is shown, where the measured speckle is essentially independent of screen type. As another benchmark, FIG. 19 depicts the coherent source speckle 460 measured for a coherent green laser source on the same three screens, where speckle dropped as screen gain dropped. Additionally, the partially coherent source speckle 470 is shown with an illumination aggregated from four green lasers that are partially incoherent sources where speckle dropped as screen gain dropped. Finally, FIG. 19 depicts the rotating plate speckle 480 produced with a despeckling device in combination with illumination involving the same four aggregated green lasers. In this instance, FIG. 19 depicts that the measured rotating plate speckle 480 dropped from about 9.8% to about 4.0% as screen gain dropped. A despeckling device can operate on coherent light (spectral bandwidth $\Delta\lambda \sim 0.05$-$1$ nm), or partially coherent light with a bandwidth $\Delta\lambda \sim 2$-$10$ nm, but also partially coherent light with larger bandwidths, e.g. $\Delta\lambda \sim 20$-$50$ nm. Although, the results of FIG. 19 illustrate a benefit of an optical despeckling device, the depicted results also indicate a relative reduction in speckle visibility, rather than an absolute reduction. The measured values obtained in given speckle measurements, which can vary by a few percent, can depend on the light source, the display surface structure, the camera set-up, and the operation of the despeckling device.

A despeckling device can be operated with variable optical path differences (OPD) as the tilted optical plate rotates. With rotation, a given image light beam or convergent cone directed to a given field location at the target surface transits the tilted optical plate(s) through different thicknesses. For example, when the plate(s) are oriented in a tilted position closest to the projection lens for a given image light beam, that image light beam transits a first optical length through the glass of the despeckler device, which is the shortest optical path length. By comparison, when the plate(s) are oriented in a tilted position furthest to the projection lens for the same given image light beam, that image light beam transits a second optical length through the glass of the despeckling device, which is the longest optical path length. The difference in these optical path lengths, or the OPD, is the maximum OPD that occurs. Intermediate OPD values occur for intermediate rotational positions. Differing OPD values occur for different image light beams that are directed to different parts of the display surface, altering the focus position of the at least partially coherent image light. As these OPDs can be large compared to the expected coherence length of the light sources, a despeckling device can also vary the temporal coherence of the image light beams and provide further speckle reduction by temporally averaging temporally incoherent speckle patterns.

As the tilted optical plate(s) are rotated, the resulting variation in OPD over time can result in at least partially coherent image light traversing a range of different distances and focusing towards a plane or surface such as the target surface. This optical path length difference can be a variation in the focus location, $\pm\Delta z$ (see FIG. 8). Although modulating the temporal coherence can affect speckle visibility, these changes in optical path length can be small relative to the depth of focus to the display surface, and may not result in significant losses in image resolution.

Examples of Additional Implementations

Although a despeckler device has been discussed relative to reducing the visibility of speckle artifacts, a despeckler device according to some aspects can be used to alter visibility of other projection image artifacts. As one example, the residual image dither can mask the visibility of modulator artifacts such as the screen door effect, from imaging the gaps between the display pixels, such as the gaps between the DMD micro-mirrors. As another example, sparkle, which is the perception of a random pattern of bright points of light that change with the position of the viewer, can be reduced. can be of particular concern for projection systems. The increased spatial and angular diversity provided by the limited image dither of a refractive speckle reduction assembly can cause portions of an image pixel to shift around locally on a screen, and if the image dither is large relative to the screen substructures causing sparkle, than temporal averaging can reduce the sparkle visibility.

In another example, a despeckler device can also be used to reduce the visibility of moiré. Moiré is a secondary and visually evident pattern created, for example, when two similar patterns are superimposed on a flat or curved surface, and are displaced or rotated a small amount from one another. In the case of cinematic projection, screens can have a pattern of perforations to enable audio sound to propagate through the screen. The perforations can be too small for the audience to perceive them. However, when digital projectors are used, magnified images of the spatial light modulator(s), having a regular array of pixels, are superimposed by optical projection onto the perforation pattern of the screen, and may create moiré patterns, which can be a visible patterned shading of the on-screen light intensity. Moiré can also be an interaction of a modulator artifact (the screen door structure) with the screen perforation pattern, to create a hybrid modulator-screen image artifact. The visibility of projection moiré can depend on the pitch and arrangement of the screen perforations, relative to the pitch and arrangement of the image pixels. Visually objectionable levels of moiré can readily occur. Notably, small displacements of the two patterns relative to each other can dramatically reduce the visibility of moiré. The residual image dither provided by some despeckling devices also modulate the instantaneous image pixel positions relative to the perforations, and can provide a time averaged reduction in moiré visibility to improve image quality.

Other mechanical concerns with respect to the mechanisms of a refractive speckle reduction assembly, such as noise and dust can be managed with little impact on the projector or audience. For example, the wedge thickness of a tilted optical plate can be modulated across the emergent image light by mechanisms other than mechanical wobble of a bulk optical plate. An equivalent mechanism can be used where the thickness and position of a thin film optical fluid on the outer surface is manipulated by centrifugal force or piezo-actuators to modulate the wedge angle.

A tilted optical plate according to some examples can be made with alternate optical materials other than glass, including optical quality plastics that can help reduce the weight of a despeckling device. A tilted optical plate can also be made with plastics or crystalline materials (e.g. CAF2 or sapphire) that are birefringent. Rotating the plate(s) can contribute polarization diversity, further reducing speckle visibility. A despeckling device can also be used in combination with other despeckling methods, such as screen shake or laser source modulation.

Furthermore, a despeckling device according to some examples can alternatively use other technologies to provide the desired temporally modulated deflection of the image light beams. For example, a comparable device constructed with an electro-optical material such lithium niobate or lithium tantalite, liquid crystal materials, or electro-optical polymers can provide the desired deflection. As such devices can be positioned in image space, the devices can have addressable control and the beam deflection may not be limited to the circular pattern provided by the rotating tilted optical plate, and more complicated patterns can be used. As an alternative, a despeckling device can include a mirror-based deflecting element having two counter-rotating flat mirrors. The first mirror can receive light from the projection optics, and redirect that light towards a second mirror, which can in turn redirect the light towards the screen. The projector and both mirrors can be tilted relative to each other, so that image light can be directed towards a given screen location with an increased angular diversity with rotation.

In some examples, a despeckling device can be used in imaging system applications other than those for projection (whether front or rear projection), where speckle needs to be reduced while image dither is controlled and reduced. For example, a despeckling device can be used in image capture systems, surface inspection systems, or in printing, photo-lithography, or other exposure systems, to operate on partially coherent and reduce speckle visibility. In printing applications, the object need not be a spatial light modulator, but instead can be an image or pattern-bearing component such as a reticle, resolution target, or photomask. The despeckling device can variably deflect image light emergent from the imaging optics. The resulting variably deflected image light can then focus towards a target plane, where a media, substrate, material (e.g., photoresist), sensor, or other receiver can be exposed or illuminated with the image light, benefiting from the speckle reduction and reduced image dither provided by the despeckling device. Similarly, a despeckling device can be used to improve an illumination system by modifying output partially coherent illumination light to exhibit a reduced speckle visibility when the illumination light is incident to a target surface. Reducing speckle structure or visibility can improve illumination uniformity at the surface. In an inspection system, the improved uniformity can result in an inspection camera that can see intensity differences related to the surface, rather than due to interference of partially coherent light (e.g., speckle). Likewise, although a despeckling device has been discussed with regards to visible light applications (e.g., image display), it also applicable to use in ultraviolet (UV) or infrared (IR) optical systems.

Various aspects and features of the present disclosure are inclusive of combinations of the examples described herein. References to a particular example and the like refer to features that are present in at least one example. Separate references to "an example" or "particular examples" or the like do not necessarily refer to the same example or examples; however, such examples are not mutually exclusive, unless so indicated or as are readily apparent to one of skill in the art. The use of singular or plural in referring to the "method" or "methods" and the like is not intended to be limiting. Furthermore, the foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:

1. A system for reducing speckle artifacts, comprising:
   a light source configured to emit light that is at least partially coherent;
   a projection lens configured to output the light as a convergent light beam towards a location on a target surface;
   a despeckling device with an optical axis and that is positionable between the projection lens and the target surface in a light path of the light, the despeckling device having at least one optical plate comprising an inner surface and an outer surface that are tilted with respect to the optical axis and that are configured to allow light emerging from the projection lens to enter the at least one optical plate through the inner surface and to exit the at least one optical plate through the outer surface, the at least one optical plate is rotatable about the optical axis to temporally and angularly deflect the convergent light beam through a plurality of angular orientations toward the location on the target surface; and
   a spatial light modulator positionable between the light source and the at least one optical plate, the spatial light modulator being configured to produce imaged light with at least one image pixel by modulating the light that is at least partially coherent.

2. The system of claim 1, wherein the inner surface or the outer surface is tilted with respect to a line perpendicular to the optical axis by a tilt angle, wherein the outer surface is nonparallel to the inner surface at a wedge angle with respect to the inner surface such that the outer surface of the at least one optical plate is tilted further away from a line perpendicular to the optical axis than the tilt angle.

3. The system of claim 2, wherein the at least one optical plate is configured to wobble in rotating in the despeckling device.

4. The system of claim 2, wherein the at least one optical plate is configured to angularly deflect the convergent light beam by an amount that is based on:
   a refractive index of the at least one optical plate;
   a thickness of the at least one optical plate;
   the tilt angle; and
   the wedge angle.

5. The system of claim 4, wherein the thickness of the at least one optical plate and the tilt angle are configured to limit an amount of astigmatism and coma to within 1/20 of a wavelength.

6. The system of claim 2, wherein the at least one optical plate includes a first optical plate and a second optical plate that are rotatable with respect to each other to change the wedge angle.

7. The system of claim 2, wherein the at least one optical plate is rotatable at a rate that is in a range of 200 revolutions per minute to 3600 revolutions per minute.

8. The system of claim 2, wherein the at least one optical plate is a meniscus-type lens.

9. The system of claim 2, wherein at least one of the inner surface or the outer surface is curved.

10. The system of claim 9, wherein a radius of curvature for the inner surface or the outer surface is in a range of 5 meters to 50 meters.

11. The system of claim 1, wherein:
the target surface is a screen,
the system is in a projector system for a theatre,
the despeckling device is configured to limit a maximum spatial displacement of the at least one image pixel to a given area on the screen to less than or equal to half of a projected pixel width.

12. The system of claim 11, wherein at least one of the inner surface or the outer surface is curved by an amount that is based on a distance between the projector system and the screen in the theatre.

13. The system of claim 1, wherein the despeckling device further comprises:
a housing that retains the at least one optical plate at a tilt angle with respect to the optical axis of the despeckling device; and
an actuator configured for rotating the at least one optical plate at a rotational velocity,
wherein the at least one optical plate has a refractive index and an optical thickness.

14. A despeckling device for reducing speckle artifacts, the device comprising:
at least one optical plate having an inner surface and an outer surface through which to transmit light, the inner surface and the outer surface being tilted with respect to an optical axis of the despeckling device that is positionable between a projection lens and a target surface in a light path of light from the projection lens to the target surface, the inner surface and the outer surface are configured to allow the light emerging from the projection lens to enter the at least one optical plate through the inner surface and to exit the at least one optical plate through the outer surface;
a housing for holding the at least one optical plate at a tilt angle to a mechanical axis of the despeckling device such that the inner surface and the outer surface of the at least one optical plate are tilted with respect to the mechanical axis; and
an actuator configured for rotating the at least one optical plate at a rotational velocity about the optical axis to deflect, angularly and temporally, a convergent light beam of light through a plurality of angular orientations toward a location on the target surface,
wherein the at least one optical plate is positionable closer in a light path to the target surface than a spatial light modulator that is configured to be positioned between the at least one optical plate and a light source and that is configured to produce imaged light with at least one pixel by modulating the light that is at least partially coherent.

15. The despeckling device of claim 14, wherein the actuator is a motor that is configured to rotate the at least one optical plate.

16. The despeckling device of claim 14, wherein the device is configured for directing a plurality of light beams toward an associated location on the target surface.

17. The despeckling device of claim 14, wherein the at least one optical plate has a refractive index and an optical thickness, wherein the at least one optical plate is configured to deflect the beam of light toward the location based on the refractive index, the optical thickness, a wedge angle between the inner surface and the outer surface, and the tilt angle.

18. The despeckling device of claim 14, wherein the at least one optical plate is interchangeable with a second optical plate from a suite of optical plates that include a single-wedged plate, a dual-wedged plate, a single curvature wedged plate, and a meniscus plate.

19. A method comprising:
directing, by a projection lens, at least partially coherent light, emitted by a light source, as a convergent light beam towards a location on a target surface;
modulating, by a spatial light modulator positioned between the light source and an optical plate of a despeckling device, the at least partially coherent light to produce imaged light with at least one image pixel;
allowing light emerging from the projection lens to enter the optical plate of the despeckling device through an inner surface of the optical plate and to exit the optical plate through an outer surface of the optical plate, the inner surface and the outer surface being tilted with respect to an optical axis of the despeckling device, the despeckling device being positioned between the projection lens and the target surface in a light path of the light; and
rotating the optical plate about the optical axis to deflect the convergent light beam temporally and rotationally through a plurality of angular orientations toward the location on the target surface.

20. The method of claim 19, further comprising deflecting the convergent light beam by an amount that is based on the inner surface of the optical plate and the outer surface of the optical plate that is nonparallel to the inner surface.

21. The method of claim 20, wherein the amount is further based on a wedge angle between the inner surface and the outer surface of the optical plate.

22. The method of claim 19, wherein the optical plate wobbles in rotating about the optical axis.

23. The method of claim 19, further comprising deflecting the convergent light beam by an amount that is based on:
a refractive index of the optical plate;
a thickness of the optical plate; and
a surface configuration of the inner surface or the outer surface of the optical plate.

24. The method of claim 19, wherein the target surface is a target surface profile of least dither of the convergent light beam at any given position on the target surface, the method further comprising:
positioning the target surface profile of least dither to match a surface profile of a display, wherein a maximum dither at the display is a projected image pixel width.

25. The method of claim 23, wherein the amount is based on the surface configuration of the inner surface and the outer surface of the optical plate, the inner surface being flat and the outer surface being nonparallel to the inner surface.

26. The method of claim 19, wherein modulating, by the spatial light modulator, the at least partially coherent light comprises modulating the at least partially coherent light towards the location on the target surface to produce an image pixel.

27. The method of claim 26, further comprising deflecting the image pixel at the location on the target surface with a spatial displacement having a maximum limit that is based on:
- a wedge angle of the outer surface with respect to the inner surface;
- a tilt angle of the optical plate with respect to an axis of rotation of the optical plate;
- a curvature of the outer surface or the inner surface; and
- an amount of wobble of the optical plate in rotating about the optical axis.

28. The method in claim 27, wherein the maximum limit of the spatial displacement for the image pixel is less than or equal to half of a projected pixel width.

29. The method of claim 19, further comprising:
operating the despeckling device with an image projection system in a theatre.

* * * * *